United States Patent [19]
Wong

[11] Patent Number: 5,432,904
[45] Date of Patent: Jul. 11, 1995

[54] AUTO REPAIR ESTIMATE, TEXT AND GRAPHIC SYSTEM

[75] Inventor: David C. Wong, Duarte, Calif.

[73] Assignee: CCC Information Services Inc., Chicago, Ill.

[21] Appl. No.: 247,241

[22] Filed: Nov. 9, 1993

Related U.S. Application Data

[63] Continuation of Ser. No. 657,130, Feb. 19, 1991, abandoned.

[51] Int. Cl.⁶ .................. G06F 3/14; G06F 17/30; G06F 17/60
[52] U.S. Cl. .................. 395/161; 395/156; 395/147; 364/401; 364/424.03
[58] Field of Search ............. 395/161, 147, 135, 160, 395/157, 156; 364/401, 424.03, 424.04, 512; 434/373, 374

[56] References Cited

U.S. PATENT DOCUMENTS

| | | | |
|---|---|---|---|
| 3,829,844 | 8/1974 | Zonneveld et al. | 395/155 |
| 3,974,482 | 8/1976 | Balashov et al. | 395/375 |
| 4,060,915 | 12/1977 | Conway | 434/307 |
| 4,404,639 | 9/1983 | McGuire et al. | 364/424.04 |
| 4,413,314 | 11/1983 | Slater et al. | 364/188 |
| 4,420,234 | 12/1983 | Dolejsi et al. | 353/122 |
| 4,435,769 | 3/1984 | Nagano et al. | 364/464.01 |
| 4,468,755 | 8/1984 | Iida | 395/600 |
| 4,520,399 | 5/1984 | Iida | 358/451 |
| 4,538,183 | 8/1985 | Kanno et al. | 358/452 |
| 4,558,374 | 12/1985 | Kurata | 358/453 |
| 4,667,248 | 5/1987 | Kanno | 358/452 |
| 4,691,238 | 9/1987 | Yamada | 358/450 |
| 4,725,892 | 2/1988 | Suzuki et al. | 358/451 |
| 4,752,908 | 6/1988 | Bouillot | 364/419 |
| 4,774,569 | 9/1988 | Morton et al. | 358/102 |
| 4,837,635 | 6/1989 | Santos | 358/401 |
| 4,891,702 | 1/1990 | Nakayama et al. | 358/140 |
| 4,893,258 | 1/1990 | Sakuragi | 395/139 |
| 4,899,292 | 2/1990 | Montagna et al. | 395/147 |
| 4,972,318 | 11/1990 | Brown et al. | 364/403 |
| 4,992,940 | 2/1991 | Dworkin | 364/401 |
| 5,128,859 | 7/1992 | Carbone et al. | 364/401 |
| 5,146,404 | 9/1992 | Calloway et al. | 364/401 |
| 5,283,865 | 2/1994 | Johnson | 395/161 |
| 5,293,309 | 3/1994 | Sakai et al. | 364/401 |
| 5,317,503 | 5/1994 | Inoue | 364/401 X |

*Primary Examiner*—Raymond J. Bayerl
*Attorney, Agent, or Firm*—David Newman & Associates

[57] ABSTRACT

A computer system including a processor, a display monitor and a mass storage device serving as a main memory for storing digital data. The digital data include information stored in digital form for a multiplicity of vehicles. A data base is provided of a plurality of groups of parts, a plurality of associated parts graphics, and a plurality of costs for repairing the parts and for replacing groups of parts. The method and apparatus include inputting vehicle-identification data of a damaged vehicle to the processor. The display monitor displays a list of groups of parts for the damaged vehicle. In response to selecting a particular group of parts, a parts description from the data base of the first group of parts is then displayed. A parts graphic may be displayed from the list of groups of parts, along with costs data including parts costs, repair time and painting time. The method and apparatus compare the sum of the costs for repairing a part of a vehicle versus the cost for replacing a part of a vehicle. Additionally, overlapping costs between two or more panels are determined, and subtracted from the total cost to repair. An electronic camera may be used for taking an electronic photograph in digital form of the damaged vehicle. The electronic photograph is transferred from the camera through a data port to the memory of the processor.

74 Claims, 8 Drawing Sheets

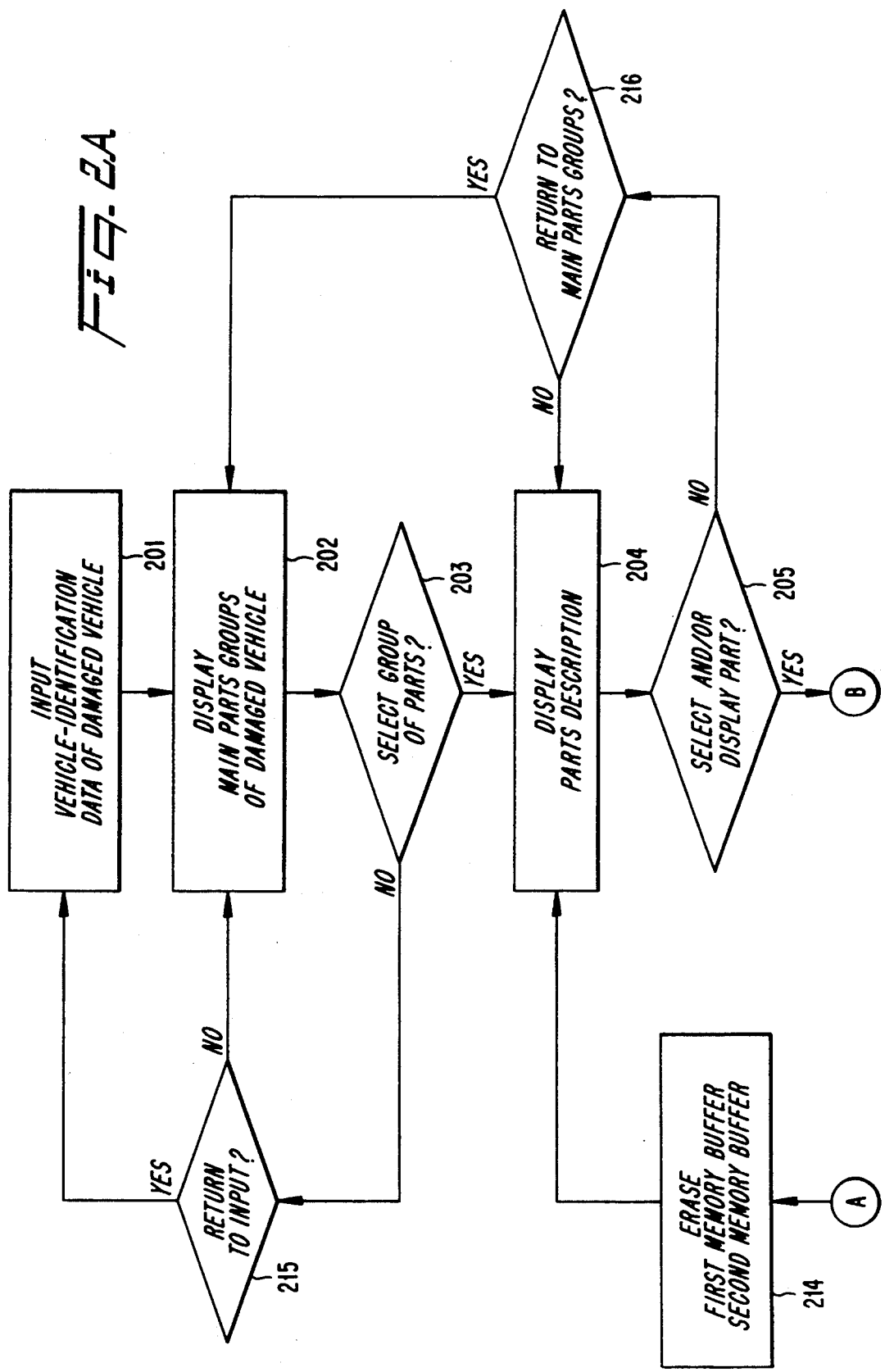

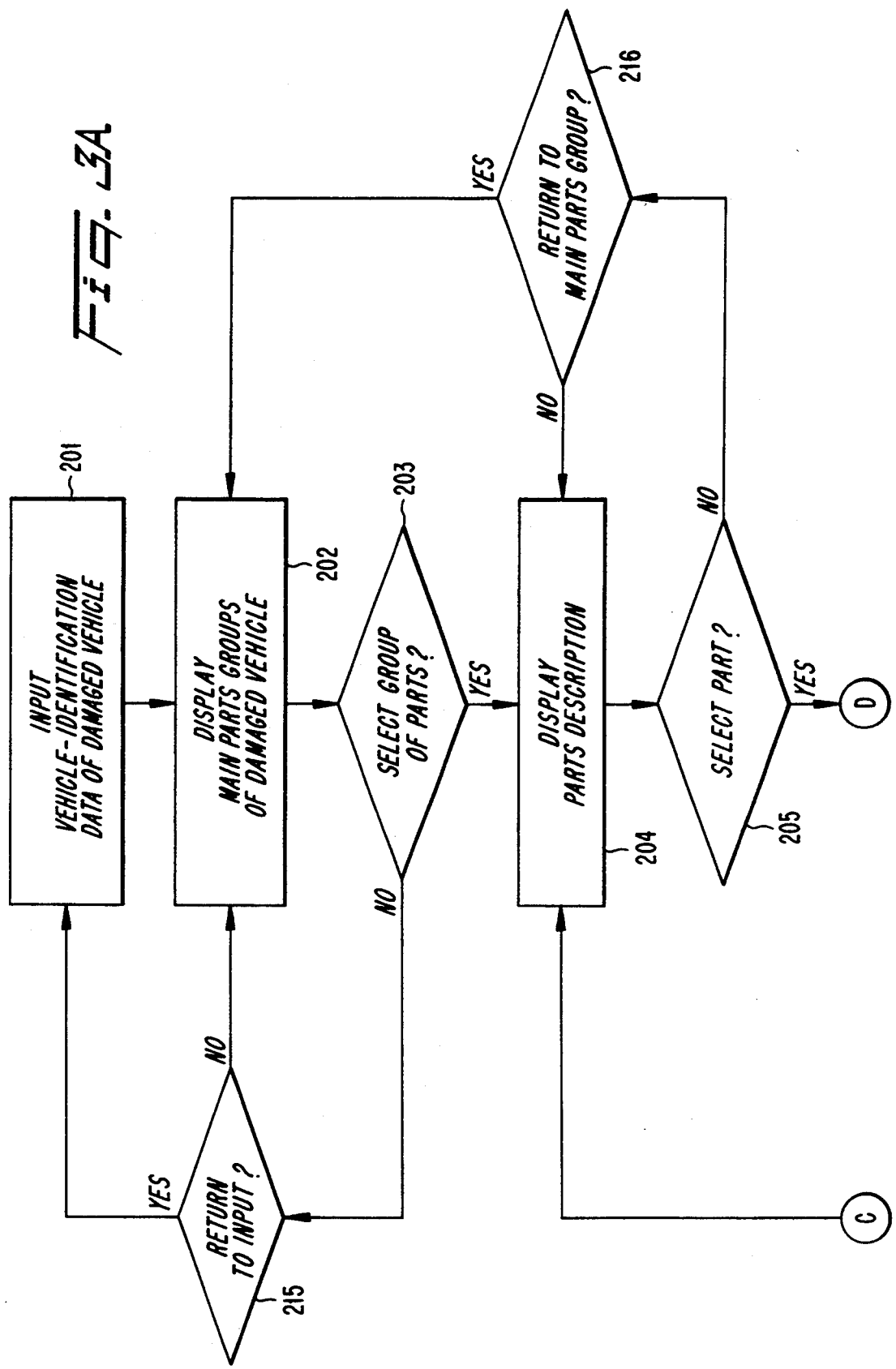

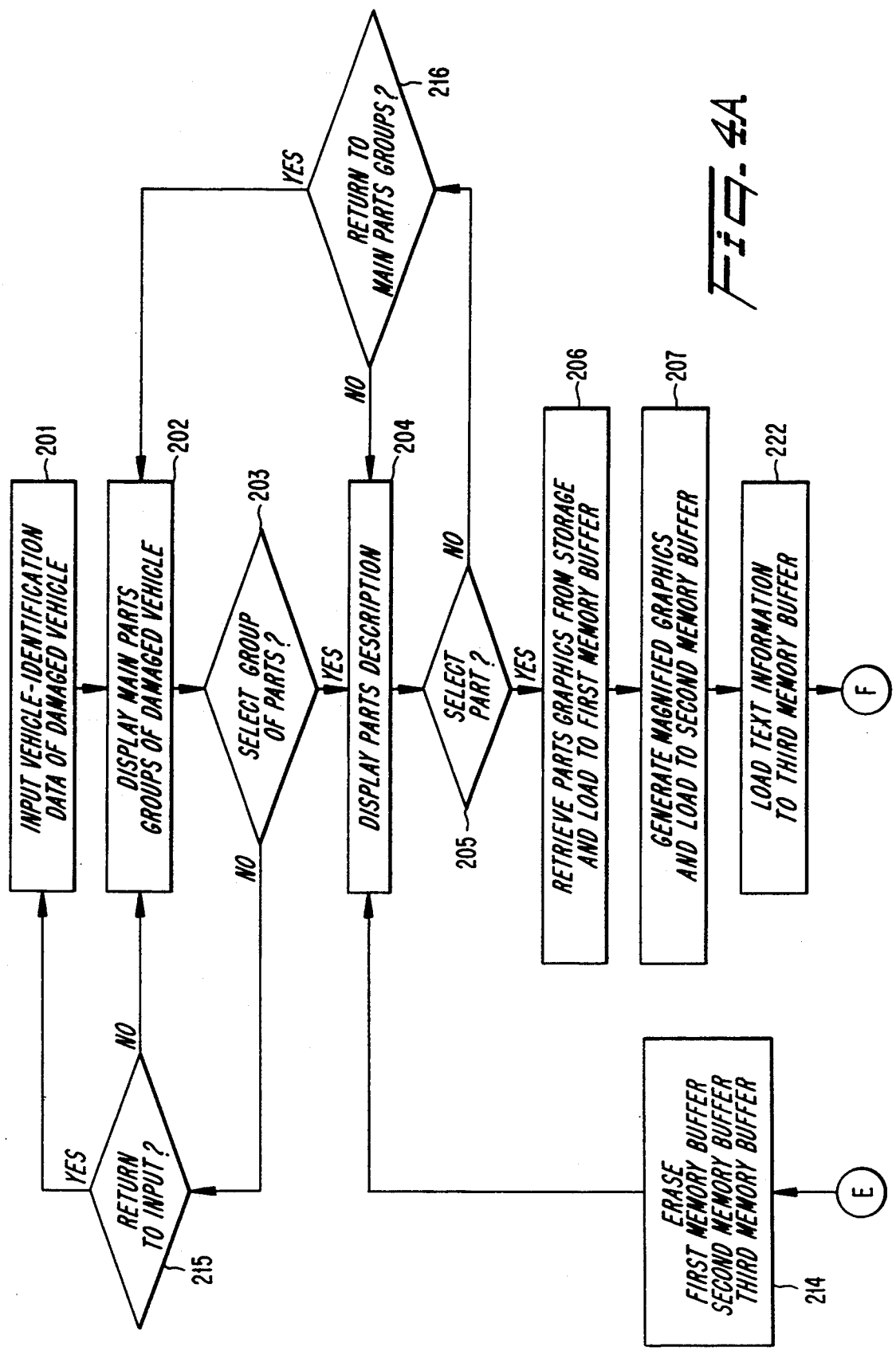

AUTO REPAIR ESTIMATE, TEXT AND GRAPHIC SYSTEM

This patent stems from a continuation of patent application entitled, AUTO REPAIR ESTIMATE, TEXT AND GRAPHICS SYSTEM, having U.S. Ser. No. 07/657,130, filing date Feb. 19, 1991, and now abandoned. The benefit of the earlier filing date of the parent patent application is claimed pursuant to 35 U.S.C. §120.

BACKGROUND OF THE INVENTION

This invention relates to a computer system for analyzing a damaged vehicle and determining an appropriate cost for repairing the damaged vehicle, and more particularly to a computer system which can compare an electronic photograph of the damaged vehicle with parts graphics and costs of parts to be repaired.

DESCRIPTION OF THE PRIOR ART

In the prior art, when estimating a cost for repairing a damaged vehicle, insurance companies typically have an adjuster inspect the damaged vehicle, and based on the adjuster's experience, estimate the cost to repair the damaged vehicle. This process uses assumptions made by the adjuster. During this process, the adjuster, intentionally or unintentionally, may not make a comparison of the cost to repair a particular part versus the cost to replace that part. The cost to replace a part may be less than the cost to repair one or more parts which are included in a panel. An adjuster also may not account for overlapping costs such as the cost for painting a rear panel and a rear fender.

An adjuster usually takes one or more pictures of the damaged vehicle as a record, and submits the photographs with a damage estimating sheet to an insurance company. To date, no apparatus integrates the insurance estimating functions including photographing the damaged vehicle, comparing the cost of parts of the damaged vehicle with the cost of panels which include all the parts to be replaced, and overlapping costs such as painting, etc.

In computerized text and graphics systems, text typically is stored in digital form and graphics images may be stored in compressed digital form or in non-compressed digital form. In non-compressed digital form, data individually defining each pixel of a graphics image are stored. Data stored in non-compressed digital form allows rapid display of the graphics, but also requires a relatively large memory to store the data because each image has thousands of pixels. In a compressed storage environment, by selecting a particular text and a set of graphics for display, the computer system decompresses the graphics stored in compressed digital form.

As defined in U.S. Pat. No. 4,899,292 to Montagna et al., text for a particular section of a document, such as a procedure for repairing one defective part of an automobile, is grouped together in a single, long, "hyperpage". At locations in the text which correspond to associated graphics, data table, and optional software routines, reference numeral are entered in the text stream for indexing the corresponding graphics, data table, and optional software routines to the text.

A block of information in Montagna et al. defines each graphics image. Each block of information is compressed and stored in digital form. Similarly, a block of information defining a data table or software subroutine also may be stored. The reference numerals indicate the locations in computer memory where the corresponding blocks of information having the graphics are stored. The text and associated graphics, table and software routines are linked to each other by the reference numerals.

For example, if one hyperpage of text relates to a particular automobile repair procedure, then the text may be linked to the graphics diagrams of the portion of the automobile having the part to be replaced and the surrounding parts which provide access to the defective part. The data table may provide the manufacturer part number of the defective part, and the software may inform the user that if he repairs or replaces the part such as a lower ball joint, then he must also perform a related service such as a front wheel alignment.

By selecting a first document, which includes text and a multiplicity of graphics images, the computer system decompresses the multiplicity of graphics associated with the first document. The document includes reference numerals which identify associated graphics images so that when the document is selected, the system can determine which graphics image should be decompressed. All the graphics image data associated with the selected document are decompressed for instantaneous display. The computer system then displays text and at least a first of the decompressed graphics images on a display screen. A user can subsequently command and display a second of the decompressed graphics images on the display screen. Because the second graphics image, which is associated with the first document, was decompressed with the first graphics image, no delay is encountered for displaying the second graphics image. The second graphics image may be selected by a touch screen overlaying the video display.

Any one of the decompressed graphics images can be enlarged and centered about a point on the screen which is touched or selected. The portion of the image to be enlarged is processed for the enlargement after all of the graphics images associated with a document have been decompressed and displayed on the screen, and after the portion of the image to be enlarged has been selected for enlargement and display.

In a service manual application for automobile repair and cost estimation, the computer system displays a graphics image of a vehicle or other object, along with text describing steps for repairing or replacing a part. In an insurance estimation function, data include the names of models of vehicles or other objects under repair, potential repair operations to be performed and related time estimates, parts lists and costs, and the graphics include different views of the vehicle or other object being repaired. By means of a touch screen, a particular part can be identified.

OBJECTS OF THE INVENTION

An object of the invention is to provide an apparatus and method which integrate estimating auto repair, displaying text and displaying graphics.

Another object of the invention is to provide an apparatus and method which can display an auto part on a display, and which can almost instantaneously display an enlarged graphics image of the auto part on the display.

An additional object of the invention is an apparatus and method which can document or record a photograph of a damaged vehicle and display the photograph while displaying and comparing damaged parts of the damaged vehicle.

A still further object of the invention is an apparatus and method which assists an adjuster in making accurate estimates of repairing and replacing parts to a damaged vehicle, at a fair cost.

SUMMARY OF THE INVENTION

According to the present invention, as embodied and broadly described herein, a computer system and process including a processor, a display monitor and memory means for storing digital data are provided. The computer system and process encompass hardware, firmware and/or software specifically designed to perform the process or functions of the present invention with the processor, display monitor and memory means. The digital data include information stored in digital form for a multiplicity of vehicles, a data base of a plurality of groups of parts, a plurality of associated parts graphics, and a plurality of costs for replacing the parts, and for replacing groups of parts.

The computer system and process comprise means for inputting vehicle-identification data, or a vehicle identification number, of a damaged vehicle to the processor. First means displays on the display monitor, a list of groups of parts for the damaged vehicle. Second means displays on the display monitor, a parts description from the data base of the first group of parts. The invention is taught, by way of example, for replacing a first part and a second part from a first group of parts, and a third part and a fourth part from a second group of parts. The present invention is by no means limited to first part, second part, third part or fourth part.

Graphics means retrieves from the memory means a first parts graphics, stored in digital form and associated with the first part, and loads the first parts graphics into a first memory buffer in response to selecting a first part from the parts description. Third means displays, on the display monitor, the first parts graphics.

Cost means retrieves from the memory means a first cost for replacing the first part in response to selecting a first part from the parts description. In response to selecting a second part from the parts description of the first group, cost means retrieves from the memory means a second cost for replacing the second part. Graphics means may retrieve from the memory means a second parts graphics associated with the second part, and load the second parts graphics into the first memory buffer. Third means displays, on the display monitor, the second parts graphics. The cost means retrieves from the memory means a first replacement cost of the first group and compares the first replacement cost with a sum of the first cost and the second cost of the first part and the second part, respectively. The cost means accordingly determines which of the first replacement cost and the sum have a first lower cost.

The present invention also includes second means for displaying on the display monitor, a parts description from the data base of the second group of parts in response to selecting a second group of parts from the list of groups of parts. Graphics means retrieves from the memory means a third parts graphics, stored in digital form and associated with the third part, and loads the third parts graphics into the first memory buffer in response to selecting a third part from the parts description. Third means displays, on the display monitor, the third parts graphics in response to loading the third parts graphics into the first memory buffer.

The second means also can display, on the display monitor, a parts description of the second group of parts in response to selecting a second group of parts from the list of groups of parts. The cost means retrieves from the memory means a third cost for replacing the third part in response to selecting a third part from the parts description of the second group. The cost means retrieves from the memory means a fourth cost for replacing the fourth part in response to selecting a fourth part from the parts description of the second group. The cost means retrieves from the memory means a second replacement cost for the second group and compares the second replacement cost with a sum of the third cost and the fourth cost. The cost means, accordingly, determines which of the second replacement cost and the sum have a second lower cost. Overlap means determines any overlap cost and subtracts from a sum of the first lower cost and the second lower cost the overlap cost to produce net cost. Third means displays on the display monitor the net cost.

The present invention also includes having graphics means generate, in digital form, a magnified graphics from the parts graphics and loading the magnified graphics into a second memory buffer. In response to selecting the magnified graphics for display, fourth means swaps the magnified graphics with the parts graphics on the display monitor.

The present invention also includes camera means for taking an electronic photograph in digital form of the damaged vehicle. Interface means is provided for transferring the electronic photograph from the camera means through a data port to the memory means of the processor. The display monitor may display the electronic photograph with the list of groups of parts for the damaged vehicle, with the parts description, or with the first part.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification illustrate preferred embodiments of the invention, and together with the description serve to explain the principles of the invention.

FIG. 2A and FIG. 2B is a flow chart of the cost estimating function of the present invention;

FIG. 3A and FIG. 3B is a flow chart of the graphics generating function of the present invention;

FIG. 4A and FIG. 4B is a flow chart of the graphics generating function with a text window.

DETAILED DESCRIPTION OF THE PREFERRED EMBODIMENTS

Figure 1:
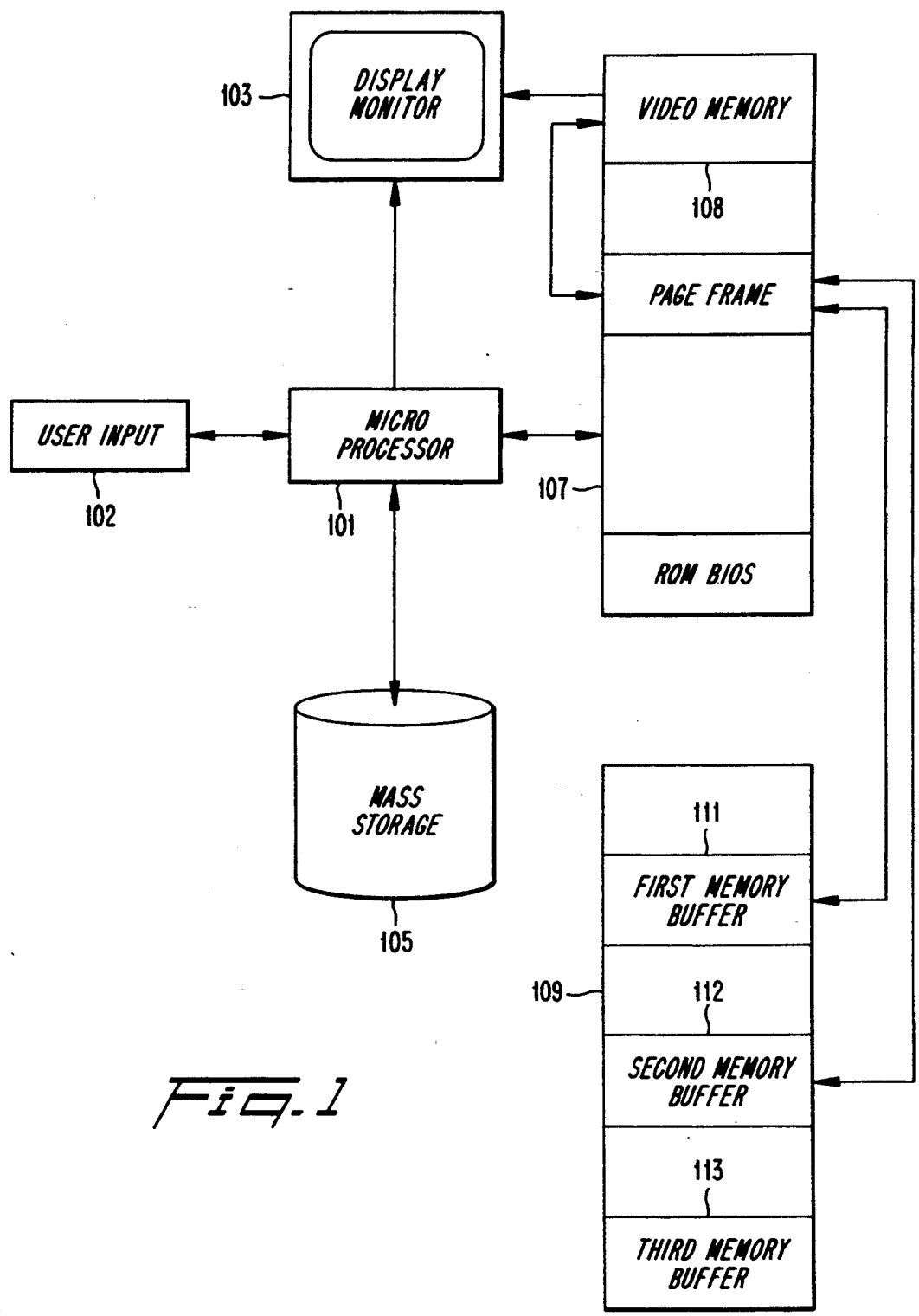
FIG. 1 shows a block diagram of the text and graphics system of the present invention.

Reference will now be made in detail to the present preferred embodiments of the invention, examples of which are illustrated in the accompanying drawings, wherein like reference numerals indicate like elements throughout the several views.

In the exemplary arrangement shown in FIG. 1, the present invention includes a text and graphics system using a computer. More specifically, the system comprises a processor 101, a display monitor 103, and memory means. The processor 101, monitor 103 and memory means may be embodied in a computer system, which, by way of example, may be a personal computer using a 8086, 80286, 80386, or 80486 microprocessor. The memory means stores digital data.

The memory means may be embodied as a mass-storage device 105, a main memory 107 and an expanded memory 109. The processor 101 is coupled to the mass storage device 105, monitor 103, and main memory 107. The main memory 107 is coupled to the expanded memory 109. The mass-storage device 105 can be a hard disk, compact disk, optical disk or other computer storage device. The main memory 107 can be embodied as random access memory (RAM), or equivalent. The expanded memory 109, which also may be RAM, or hard disk, is used once the system detects insufficient available main memory 107. The expanded memory 109 includes a first memory buffer 111, a second memory buffer 112 and a third memory buffer 113. The first memory buffer 111, second memory buffer 112 and third memory buffer 113 may be embodied as virtual memory in a RAM.

The main memory 107 has a video memory 108 included therein, or external thereto, which stores in a display format, information which is displayed on the display monitor 103. The information stored in the video memory 108 is used to refresh the display on the display monitor 103. The information may be text, a graphics image or a combination thereof. The mass storage device 105 stores a data base of text, and graphics images which may be in compressed digital form. The digital data stored in memory means include a data base, for a multiplicity of vehicles, of a plurality of groups of parts, a plurality of associated parts graphics, and a plurality of costs for replacing the parts and for replacing groups of parts. The term cost, as used herein, means broadly any cost encountered for replacing parts and/or replacing groups of parts of the damaged vehicle. Such costs may include parts costs, labor time, painting, etc. The data base may include, for example, the replacement parts, times, procedures and footnotes for automobiles. The compressed digital form may use PCX, TIFF or other graphics format.

The computer system also includes means for inputting vehicle-identification data of a damaged vehicle to the processor 101. The inputting means may be embodied as a user input 102, such as a keyboard working cooperatively with software.

Figure 2B:
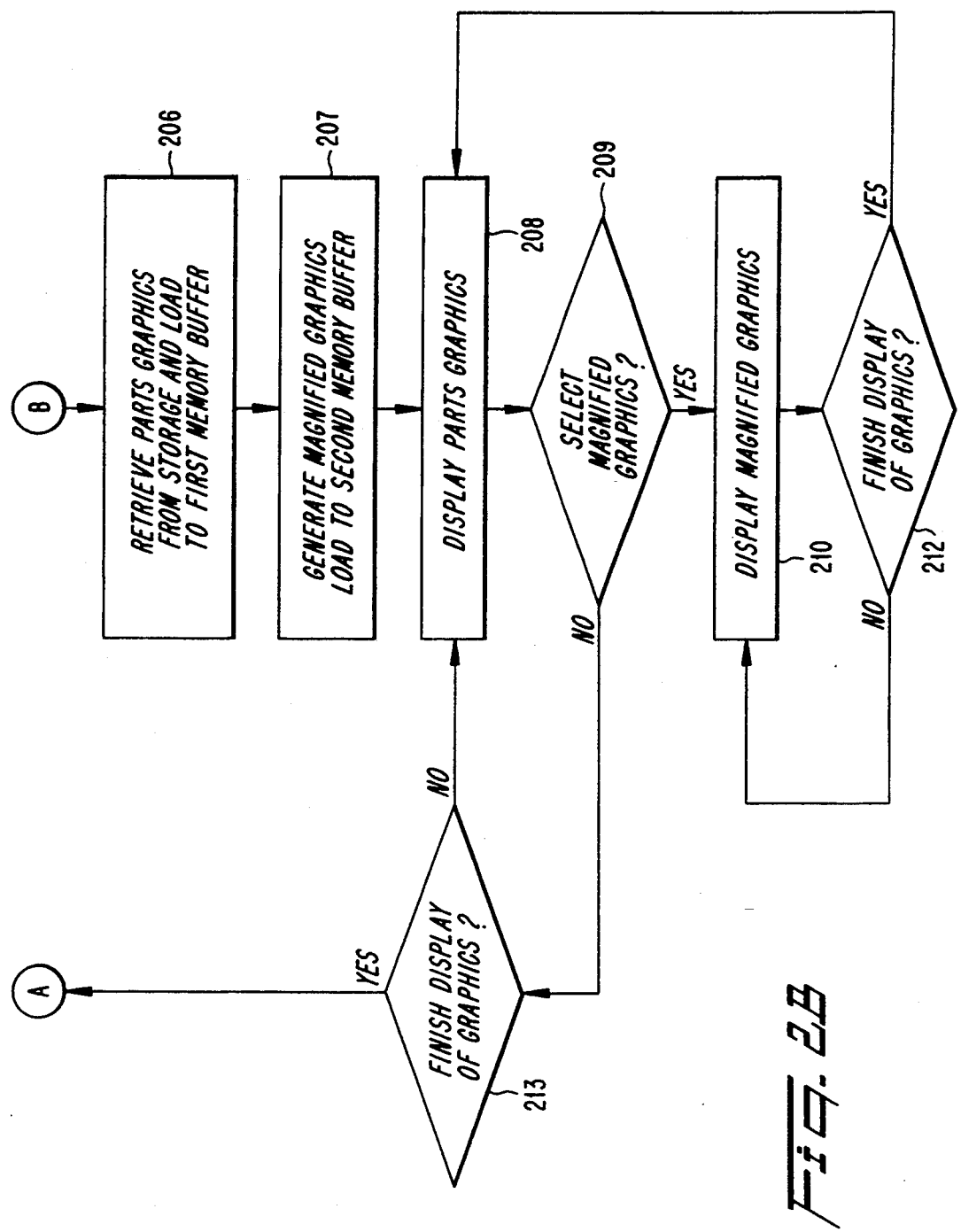

The present invention may be embodied as an apparatus or process, and the following discussion incorporates both embodiments. Referring to FIG. 2A and FIG. 2B, a user inputs 201, using the user input 102 of FIG. 1, vehicle-identification data of the damaged vehicle. The vehicle-identification data optionally can be verified as valid, prior to proceeding with the process of the present invention. The vehicle serial number, model, year and other vehicle information may be incorporated into the validity check. First means displays 202 on the display monitor 103 of FIG. 1, a list of groups of parts for the damaged vehicle in response to receiving and/or verifying in the computer system the vehicle-identification data. The first means can be software or firmware in RAM or in a read-only-memory (ROM), operating with processor 101. The list of groups of parts might include, for example, main parts groups such as: front bumper; frame; grill and lamps; fender and lamps; engine, transmission and axle; wheels and front suspension; front door, rear door; steering; trunk lid; rear body and lamps; fuel systems; rear suspension; rear bumper; and interior trim. The list of groups of parts, the groups of parts and the parts are stored in a data base in mass-storage device 105.

The user has the option to select 203, using user input 102, a first group of parts from the list of groups of parts. Second means displays 204 on the display monitor 103, a parts description from the data base of the first group of parts, in response to selecting 203 a first group of parts from the list of groups of parts. By way of example, if the front bumper were selected as the first group, then the first group of parts might include: face bar; rubber strip; guard; extension; support; filler; moulding; license bracket; and energy absorber. Second means may be software or firmware in RAM or ROM operating with processor 101.

The present invention illustratively is taught for a first part and a second part selected from a first group of parts, and a third part and a fourth part selected from a second group of parts. The present invention is not limited to only two parts from a group of parts or to only two groups of parts. Any number of parts can be selected for repair from a particular group of parts, and any number of groups of parts may be selected.

The user has the option to select 205, using user input 102, a first part from the parts description. Graphics means retrieves 206 from the mass-storage device 105 of FIG. 1, a first parts graphics, stored in digital form and associated with the first part, and loads the first parts graphics into a first memory buffer 111 in response to selecting 205 the first part from the parts description. Graphics means subsequently generates 207 a first magnified graphics from the first parts graphics and loads the first magnified graphics into a second memory buffer 112. After loading the first parts graphics and first magnified graphics into the first memory buffer 111 and second memory buffer 112, respectively, third means displays 208, on the display monitor 103, the first parts graphics. Thus, if the face bar were selected from the first group of parts as the first part, then graphics means would retrieve as the first parts graphics a graphical representation of the face bar and store the graphical representation of the face bar as the first parts graphics in the first memory buffer 111. The graphical representation of the face bar also would be enlarged and stored as the first magnified graphics in the second memory buffer 112. The graphical representation of the face bar stored in first memory buffer 111 is initially displayed on display monitor 103.

The user has the option, using user input, to select 209 the first magnified graphics for display on display monitor 102. If the first magnified graphics were selected, then the enlarged graphical representation of the face bar, for example, stored in second memory buffer 112 is displayed 210 on display monitor 103. The user has the option to finish 212, 213 displaying the graphical images. When the user is finished looking at a particular part, such as the face bar, then the first memory buffer 111 and second memory buffer 112 are erased 214.

Figure 3B:
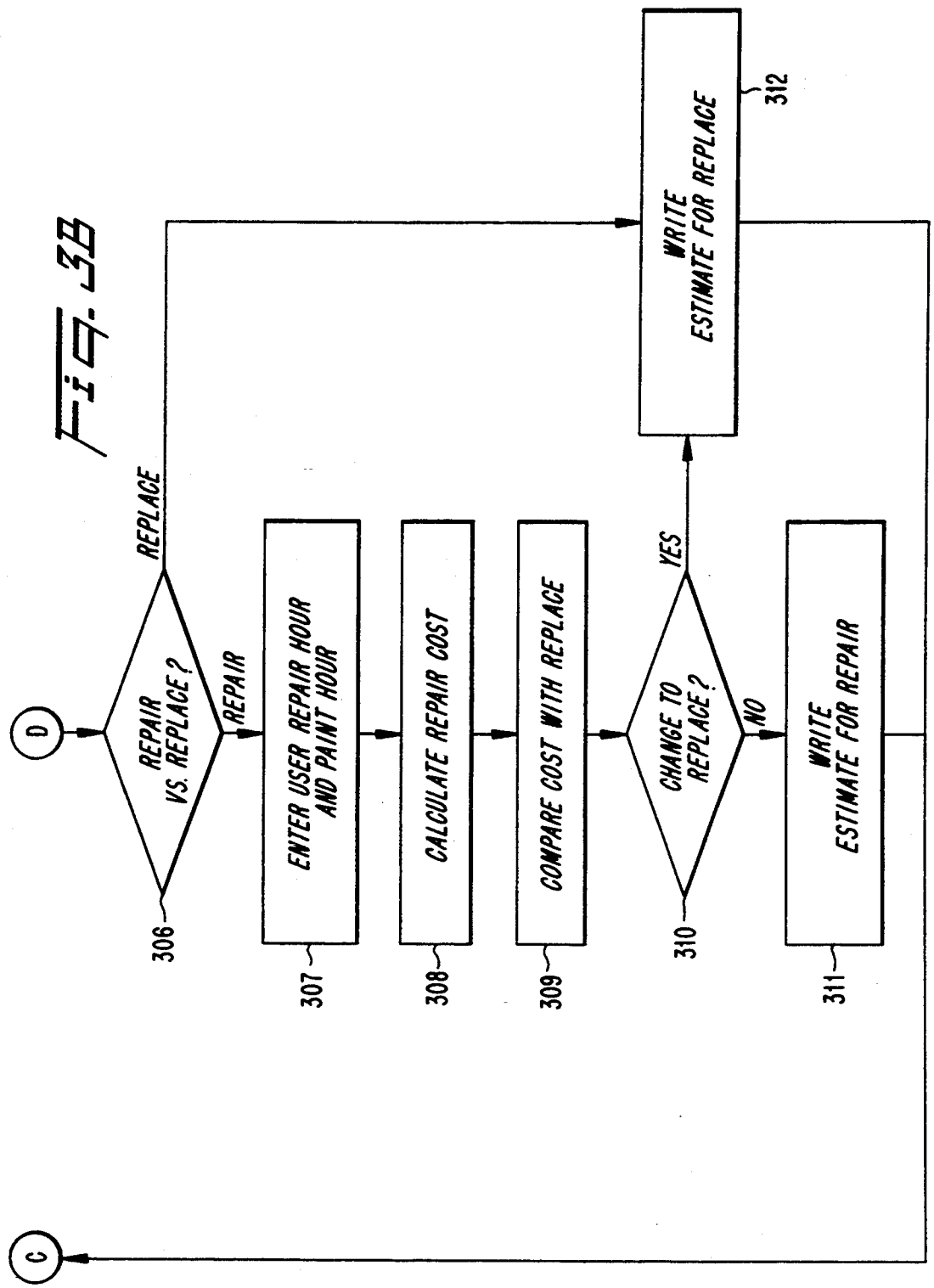

Referring to FIG. 3A and FIG. 3B, a user has the option to select 306 using user input 102, whether to replace a part or replace it. The user can retrieve 307 a first cost for replacing a first part by selecting a first part from the parts description. A second part or any number of additional parts from the parts description of the first group may be selected 307. In response to selecting a second part from the parts description of the first group, cost means retrieves from the memory means a second cost for replacing the second part. Graphics means optionally may retrieve from the memory means a second parts graphics associated with the second part, and load the second parts graphics into the first memory buffer. Third means displays, on the display monitor 103, the second parts graphics. Additional parts may be selected from the first group, as required.

The cost means calculates 308 the total cost to repair, as a sum. The cost broadly includes a part cost to replace a part, labor hours to replace the part and paint hours to paint the part, if required. Thus, from the first group for the front bumper, the first part might be to replace a face bar with a part cost of $228.80, labor of 1.8 hours to replace, and no hours for paint. The second part might be to replace a rubber strip with a part cost of $18.45, labor of 0.3 hours to repair the face bar, and no hours for paint.

The cost means retrieve from the memory means a first replacement cost of the first group and compares 309 the first repair cost with a sum of the first cost and the second cost of the first part and the second part, respectively. The cost means accordingly allows the user to determine which of the first replacement cost and the sum have a first lower cost.

The user has the option to select 310 the sum or cost to replace the panel and then write 311 an estimate for repairing or 312 for replacing the damaged vehicle.

Third means, graphics means and cost means may be software or firmware embedded in RAM working cooperatively with processor 101. The costs for repairing parts and the replacement cost for a group of parts are stored in a data base in mass storage device 105.

Referring to FIG. 3A and FIG. 3B, the present invention also includes having second means display 204 on the display monitor 103, a parts description from the data base of a second group of parts in response to selecting 203 a second group of parts from the list of groups of parts. The second means displays, on the display monitor 103, a parts description of the second group of parts in response to selecting a second group of parts from the list of groups of parts. The second group of parts might be for the grille and lamps. The second group of parts for the grille and lamp might include: mount bracket; support bracket; aim headlamps; headlamp assembly; sealed beam; and retainer ring.

The user has the option to select 205, using user input 102, a third part from the second group of parts. Graphics means, see FIG. 2A, accordingly retrieves 206 from the mass storage device 105 a third parts graphics, stored in digital form and associated with the third part, and loads 207 the third parts graphics into a first buffer 111 in response to selecting 205 the third part from the parts description. Third means displays 208, on the display monitor 103, the third parts graphics after loading the third parts graphics into the first buffer 111.

The cost means may retrieve from the mass-storage device 205 a third cost for replacing the third part in response to selecting 205 a third part from the parts description of the second group. The user has the option to select 205, using user input 102, a fourth part or any number of additional parts from the parts description of the second group. The cost means retrieves from the mass-storage device 105 a fourth cost for replacing the fourth part after selecting 205 a fourth part from the parts description of the second group. The third part, such as a right sealed beam inner standard, might have a cost of $16.45 and labor of 0.3 hours. A fourth part may be selected, such as to replace a right headlamp assembly, and displayed on the display monitor 103. The fourth part, such as replace a right headlamp assembly, might have a cost of $42.13 and labor of 0.3 hours.

The cost means retrieves from the mass-storage device 105 a second replacement cost for the second group and compares 309 the second replacement cost with a sum of the third cost and the fourth cost. The replacement cost for overhauling the grille and lamps might be greater than the costs to replace third and fourth parts. The cost means, accordingly, allows a user to determine which of the second replacement cost and the sum have a second lower cost.

Overlap means determines any overlap cost and subtracts from a sum of the first lower cost and the second lower cost the overlap cost to produce net cost. The overlapping costs can come from parts, labor hours and/or painting hours. By way of example, assume the first group of parts is for the roof and back glass. From the first group, a roof panel with sunroof is selected as the first part, with a part cost of $657.00, labor of 18.5 hours and painting of 4.5 hours. The back glass also is selected from the first group, with a part cost of $156.00, labor of 1.8 hours and no painting hours. Since the labor for replacing the back glass is included with replacing the roof panel with a sunroof, the labor of 1.8 hours for replacing the back glass is subtracted out, i.e., included in the labor for replacing the roof panel. Similarly, reveal moulding may be selected as a third part with a part cost of $12.45 and labor of 0.3 hours. The labor of 0.3 hours for replacing the reveal moulding would be included in the labor of 18.5 hours for replacing the roof panel. Thus, the total cost for the first group is $825.45 for part cost, 18.5 hours labor, and 4.5 hours painting.

Assume the second group of parts is for replacing a right outer panel. The total cost of the second group is $304.00 part cost, 13.5 hours labor and 2.8 hours painting. Between the right outer panel, the second group, and the first group, the roof and back glass, when replacing parts from both groups, there are overlapping labor hours and painting hours. The overlapping labor hours might be 4.0 hours and painting hours might be 0.4 hours. Overlapping means determines these overlapping costs, and displays them on the display monitor 103. The overlapping costs are subtracted from the total costs to repair and/or replace parts and/or panels of the damaged vehicle. Third means displays on the display monitor 103 the net cost.

Referring back to the illustrative flow chart in FIG. 2B, the present invention also includes having graphics means generate 207, in digital form, a magnified graphics from the parts graphics and loading 207 the magnified graphics into a second memory buffer 112. The user has an option to select 209 the magnified graphics for display. In response to selecting 209 the magnified graphics for display, fourth means swaps the magnified graphics from the second memory 108 for display 210 on the display monitor 103. While displaying 210 the magnified graphics, the user has the option to select 212, to continue displaying the magnified graphics 210 or the parts graphics 208. Accordingly, fourth means swaps the parts graphics from the first virtual memory buffer 111 with the magnified graphics for display 208 on the display monitor 103. The parts graphics for example, might be a right headlamp assembly and the magnified graphics an enlarged version of the right headlamp assembly. Fourth means may be embodied as software operating cooperatively with processor 101. When the user is finished 213 displaying parts graphics and magnified graphics, the processor 101 erases 214 first memory buffer 111 and second memory buffer 112.

Figure 4B:
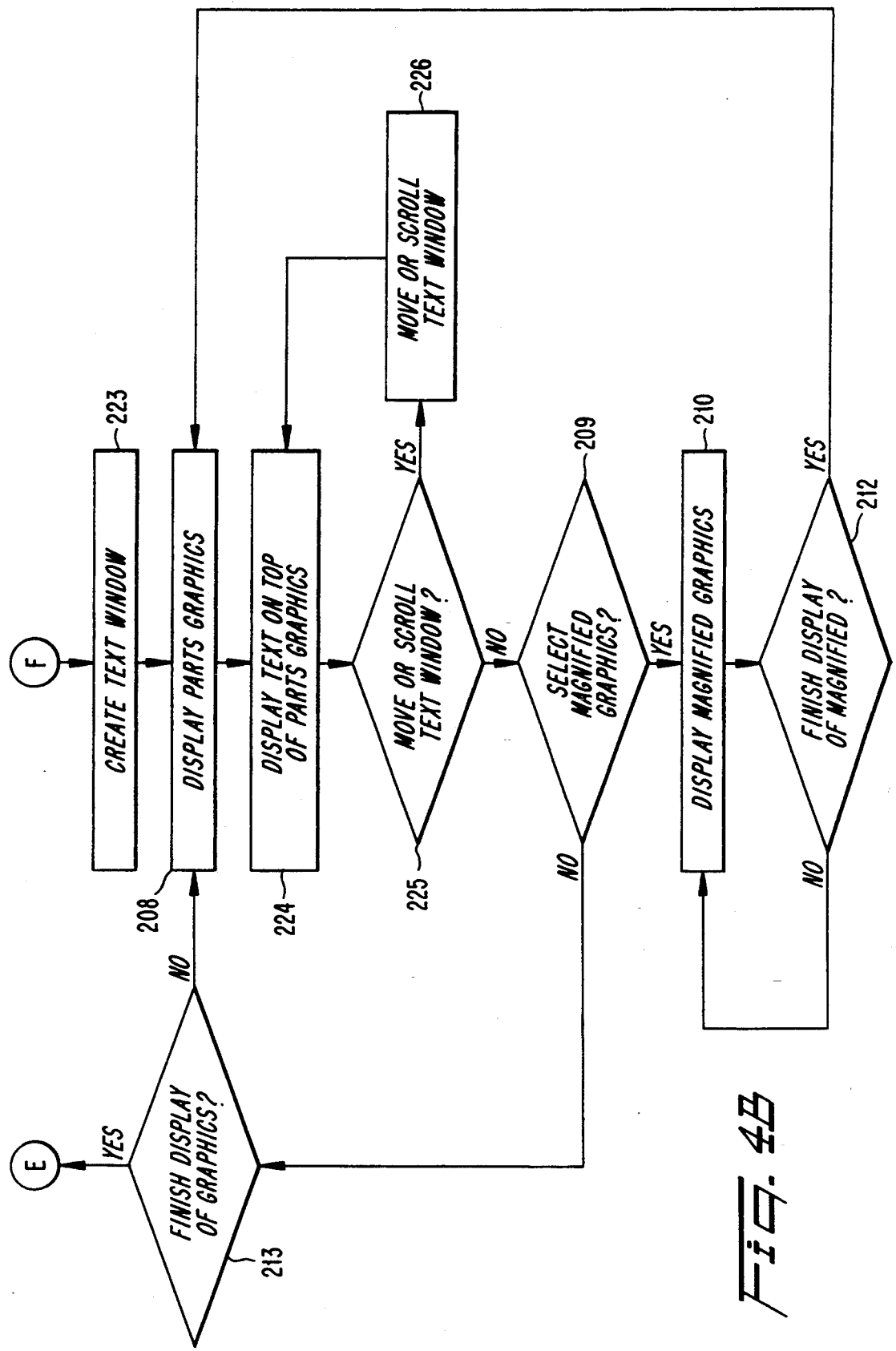

In the exemplary process shown in FIG. 4A and FIG. 4B, the present invention further includes text means. In response to selecting 205 the first part from the parts description, text means retrieves from the memory means text information. The text information is stored in digital form and associated with the first part. The text means loads 222 the text information into a third memory buffer and creates 223 a text window for displaying 224 the text information on top of the parts graphics. The user has the option 225 to move or scroll 226 the text window. The text window is displayed at the same time as displaying the parts graphics or the magnified graphics. When the user is finished 213 displaying the parts graphics or magnified graphics, and the text window, the processor 101 erases 214 the first memory buffer 111, second memory buffer 112, and third memory buffer 113.

Figure 5:
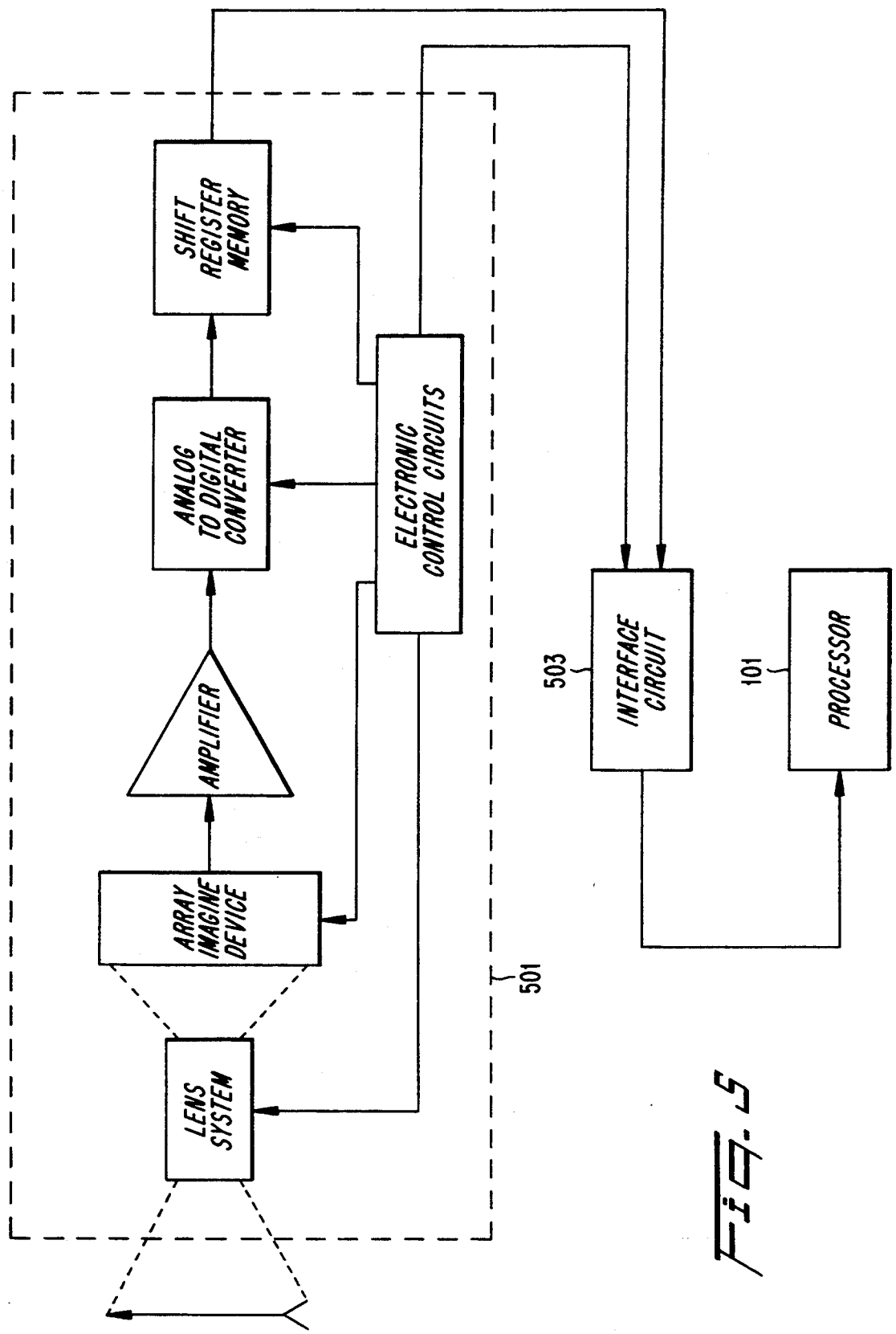
FIG. 5 shows a diagram of the electronic camera with the present invention.

The present invention, as illustratively shown in FIG. 5, also includes camera means embodied as an electronic camera 501 for taking an electronic photograph in digital form of the damaged vehicle. The electronic camera 501 is disclosed in U.S. Pat. No. 4,074,324 to Barnett, which is incorporated herein by reference. Interface means shown as interface circuit 503 is provided for transferring the electronic photograph from the electronic camera 501 through a data port to the memory means of the processor 101. The display monitor 103 may display the electronic photograph of the damaged vehicle on the display with the list of groups of parts for the damaged vehicle, with the parts description, or with the first part.

In use, a user using the processor selects a part from the data base menu, which is displayed on the display monitor 103. The processor 101 retrieves from the mass-storage device 105 a parts graphics image of the selected part, which is stored in compressed digital form. The processor decompresses the parts graphics image to a raster format for display on the display monitor 103. The processor 101, using graphics means, also generates an enlarged or magnified graphics image from the parts graphics image. The enlarged or magnified graphics image may be, for example, a 4:1 enlargement of the parts graphics image. To allow rapid display, scrolling of parts and enlarged graphics images in real time, the two entire images are loaded into the virtual memory buffers. The parts graphics image is stored in the first memory buffer 111, and the enlarged graphics image is stored in the second memory buffer 112. The first, second and third memory buffers can be a virtual memory buffer located in conventional computer memory, expanded memory, extended memory, or disk memory. Also, the processor may store the parts graphics image in the first memory buffer 111 prior to generating the enlarged graphics image from the parts graphics image.

The operator may select, after the parts graphics image and the magnified graphics image are stored in the first memory buffer 111 and the second memory buffer 112, either the parts or enlarged graphics image for display on the display monitor 103. In practice, the operator selects a part from the data base menu for display on the display monitor 103. In response to the selection, the processor 101 retrieves a graphics image from the mass storage device 105, decompresses the graphics image as the parts graphics image, stores the parts graphics image in the first memory buffer 111, generates a magnified graphics image, and stores the magnified graphics image in the second memory buffer 112. The parts graphics image is also stored in the video memory 108 and displayed on the display monitor 103.

The operator can select a region of the parts graphics image for magnifying, by displaying a portion of the enlarged graphics image on the display monitor 103. Normally a window is placed over the parts graphics image of the region to be enlarged. In response to an operator command, the processor 101 can display a corresponding region of the enlarged graphics image through the window. Alternatively, in response to an operator command, the processor can enlarge the window, thereby displaying a larger region of the enlarged graphics image, the processor 101 does not generate an enlarged graphics image in response to the operator's selection, but merely swaps a corresponding region of the enlarged graphics from the second memory buffer 112 into video memory 108, for display on top of the parts graphics image—overlaying the enlarged graphics image on the original parts graphics image. The parts graphics image and the enlarged graphics image correspond to the data base parts description.

The present invention also includes a method using a processor having a display and memory means for storing digital data including a parts graphics. The method comprises the steps, using the processor, of inputting 201 vehicle-identification data of a damaged vehicle into the processor, displaying 202, on the display monitor 103, a list of groups of parts for the damaged vehicle; and selecting 203 from the list of groups of parts a first group of parts for display. A user has the option to not select 203 a group of parts, and instead return 215 to the main menu and input 201 vehicle-identification data. If a first group of parts were selected 203, then the processor 101 displays 204, on the display monitor 103, the first group of parts; and the user may select 205 from the first group of parts a first part for display.

A user has the option to not select 205 the first part, and instead return 216 to displaying 204, the parts description or to displaying 202 the parts groups of damaged vehicle 205. If a first part is selected 205 then the processor retrieves 206 from memory means, in response to selecting the first part, a first parts graphics and/or a first cost for replacing the first part. The processor 101 then loads 207, the first parts graphics into a first buffer. The processor 101 also generates 207 from the first parts graphics a first magnified graphics in digital form, and loads 207 the first magnified graphics into a second buffer. Accordingly, the processor 101 displays 208, from the first buffer onto the display monitor 103, the first parts graphics 202.

A user has the option to select 209 the first magnified graphics for display. If the first magnified graphics were selected, then the processor 101 swaps 210 the first magnified graphics, from the second buffer onto the display, with the parts graphics. If the first magnified graphics were not selected 209, then the user has the option to finish 213 displaying the first parts graphics and erasing 214 the first buffer and the second buffer. After erasing 214 the first buffer and the second buffer, the user may select 205 from the first group of parts a second part for display. If the second part were selected, then the processor retrieves 206 from memory means, in response to selecting the second part, a second cost for replacing the second part, loads 207 the second parts graphics into the first buffer, and generates 207 from the parts graphics a magnified graphics in digital form. The processor 101 then loads 206 the second magnified graphics into a second buffer, displays 208, from the first buffer onto the display, the second parts graphics. The user then has the option to select the second magnified graphics for display.

If the second magnified graphics were selected then the processor swaps 210 the second magnified graphics, from the second buffer onto the display, with the second parts graphics.

The processor also computes a sum of the first cost and the second cost, retrieves from the memory means a replacement cost for the first group, determines a lower cost of the replacement cost and the sum, and displays the lower cost on the display.

The method may further comprise the steps of taking with camera means an electronic photograph in digital form of the damaged vehicle, transferring the electronic photograph from the camera means to the memory means of the processor, and displaying the electronic photograph on the display with the list of groups of parts for the damaged vehicle, with the parts description, or with the first part.

It will be apparent to those skilled in the art that various modifications can be made to the auto repair, text and graphics system of the instant invention without departing from the scope or spirit of the invention, and it is intended that the present invention cover modifications and variations of the auto repair, text and graphics system provided they come in the scope of the appended claims and their equivalents.

I claim:

1. A system including a processor having a data port, a display, memory means for storing digital data for a multiplicity of vehicles, said digital data including a data base of a plurality of groups of parts and a plurality of associated parts graphics, comprising:

camera means for taking an electronic photograph in digital form of a damaged vehicle;

interface means for transferring said electronic photograph from said camera means through said data port of said processor to said memory means;

said processor means further comprising:

means for inputting vehicle-identification data of said damaged vehicle to said processor;

first means, responsive to the vehicle-identification data, for displaying, on said display, said electronic photograph and a list of groups of parts for said damaged vehicle;

second means, responsive to selecting a first group of parts from said list of groups of parts, for displaying, on said display, said electronic photograph and a parts description from said data base of the first group of parts;

graphics means, responsive to selecting a first part from the parts description, for retrieving from said memory means a first parts graphics, stored in digital form and associated with said first part, said graphics means loading said first parts graphics into a first memory buffer, with said first memory buffer separate from said memory means, said graphics means generating, in digital form, a first magnified graphics of said first parts graphics and said graphics means loading said first magnified graphics into a second memory buffer, with said second memory buffer separate from said memory means and said first memory buffer, said second memory buffer storing the first magnified graphics simultaneously as said first memory buffer stores said first parts graphics;

third means, responsive to loading said first parts graphics into said first memory buffer, for displaying, on said display, said electronic photograph and said first parts graphics; and fourth means, responsive to selecting said first magnified graphics, for swapping said first magnified graphics from said second memory buffer with said first parts graphics on said display, and displaying said electronic photograph with said first magnified graphics.

2. The system as set forth in claim 1 wherein said fourth means responsive to selecting said first parts graphics swaps said first parts graphics with said first magnified graphics on said display, and displays said electronic photograph with said first parts graphics.

3. The system as set forth in claim 1 further including text means, responsive to selecting said first part from said parts description, for retrieving from said memory means text information, stored in digital form and associated with said first part, said text means loading said text information into a third memory buffer with said third memory buffer separate from said memory means, said first memory buffer and said second memory buffer; and wherein said third means displays, on said display, said text information on top of said first parts graphics.

4. The system as set forth in claim 3 further including:
fifth means for scrolling a text window over said first parts graphics.

5. A system including a processor having a display and memory means for storing digital data for a multiplicity of vehicles, said digital data including a data base of a plurality of groups of parts and a plurality of associated parts graphics, comprising:

means for inputting vehicle-identification data of a damaged vehicle to said processor;

first means, responsive to the vehicle-identification data, for displaying on said display, a list of groups of parts for said damaged vehicle;

second means, responsive to selecting a first group of parts from said list of groups of parts, for displaying, on said display, a parts description from said data base of the first group of parts;

graphics means, responsive to selecting a first part from the parts description, for retrieving from said memory means a parts graphics, stored in digital form and associated with said first part, for loading said parts graphics into a first memory buffer with said first memory buffer separate from said memory means, generating, in digital form, a magnified graphics from said parts graphics and for loading said magnified graphics into a second memory buffer, with said second memory buffer separate from said memory means, said second memory buffer storing the magnified graphics simultaneously as said first memory buffer stores the parts graphics;

third means responsive to loading said parts graphics into said first memory buffer for displaying, on said display, said parts graphics from said first memory buffer; and fourth means responsive to selecting said magnified graphics for swapping said magnified graphics from said second memory buffer with said parts graphics on said display.

6. The system as set forth in claim 5 wherein said fourth means responsive to selecting said parts graphics swaps said parts graphics with said magnified graphics on said display.

7. The system as set forth in claim 5 further including text means, responsive to selecting said first part from said parts description, for retrieving from said memory means text information, stored in digital form and associated with said first part, said text means loading said text information into a third memory buffer with said third memory buffer separate from said memory means; and wherein said third means displays, on said display, said text information on top of said parts graphics.

8. The system as set forth in claim 7 further including:
fifth means for scrolling a text window over said parts graphics.

9. The system as set forth in claim 5 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said list of groups of parts for said damaged vehicle.

10. The system as set forth in claim 5 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said parts description.

11. The system as set forth in claim 5 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said first part.

12. A system including a processor having a display and memory means for storing digital data for a multiplicity of vehicles, said digital data including a data base of a plurality of groups of parts and a plurality of associated parts graphics, comprising:
means for inputting vehicle-identification data of a damaged vehicle to said processor;
first means, responsive to the vehicle-identification data, for displaying on said display, a list of groups of parts for said damaged vehicle;
second means, responsive to selecting a first group of parts from said list of groups of parts, for displaying, on said display, a parts description from said data base of the first group of parts;
graphics means, responsive to selecting a first part from the parts description, for retrieving from said memory means a parts graphics, stored in digital form and associated with said first part, and loading said parts graphics into a first memory buffer with said first memory buffer separate from said memory means, generating, in digital form, a magnified graphics into a second memory buffer, with said second memory buffer separate from said memory means, said second memory buffer storing the magnified graphics simultaneously as said first memory buffer stores the parts graphics; and
third means, responsive to loading said parts graphics into said first memory buffer, for displaying, on said display, said parts graphics.

13. The system as set forth in claim 12 further comprising fourth means responsive to selecting said magnified graphics for swapping said magnified graphics with said parts graphics on said display.

14. The system as set forth in claim 12 further including text means, responsive to selecting said first part from said parts description, for retrieving from said memory means text information, stored in digital form and associated with said first part, said text means loading said text information into a third memory buffer, with said third memory buffer separate from said memory means; and wherein said third means displays, on said display, said text information on top of said parts graphics.

15. The system as set forth in claim 14 further including:
fourth means for scrolling a text window over said parts graphics.

16. The system as set forth in claim 15 further including fifth means, responsive to selecting said parts graphics, for swapping said parts graphics with said magnified graphics on said display.

17. The system as set forth in claim 12 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said list of groups of parts for said damaged vehicle.

18. The system as set forth in claim 12 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said parts description.

19. The system as set forth in claim 12 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said first part.

20. A system including a processor having a display and memory means for storing digital data for a multiplicity of vehicles, said digital data including a data base of a plurality of groups of parts and associated costs for repairing said groups of parts and costs for replacing said groups of parts, comprising:

means for inputting vehicle-identification data of a damaged vehicle to said processor;

first means responsive to the vehicle-identification data for displaying, on said display, a list of groups of parts for said damaged vehicle;

second means responsive to selecting a first group of parts from said list of groups of parts for displaying on said display, a parts description of the first group of parts;

cost means responsive to selecting a first part from the parts description for retrieving from said memory means a first cost for repairing said first part, said cost means responsive to selecting a second part from the parts description for retrieving from said memory means a second cost for repairing said second part;

wherein said cost means responsive to selecting said first part and said second part retrieves from said memory means a replacement cost for said first group and compares said replacement cost with a first sum of said first cost and said second cost for determining which of said replacement cost and said first sum have a lower cost; and third means for displaying on said display said lower cost.

21. The system as set forth in claim 20 wherein said cost means responsive to selecting a third part from the parts description retrieves from said memory means a third cost for repairing said third part, said cost means computes a second sum of said first cost, said second cost and said third cost and determines which of said second sum and said replacement cost have a lowest cost; and said third means displays on said display said lowest cost.

22. The system as set forth in claim 20 wherein said cost means, responsive to selecting a plurality of parts from the parts description, retrieves from said memory means a plurality of costs associated with said plurality of parts for repairing said plurality of parts, with said cost means, responsive to selecting said first part, said second part, and said plurality of parts, comparing said replacement cost with a third sum of said first cost, said second cost and said plurality of costs for determining which of said replacement cost and said third sum have a lowest cost; and said third means displays on said display said lowest cost.

23. A system including a processor having a display and memory means for storing digital data for a multiplicity of vehicles, said digital data including a data base of a plurality of groups of parts and a plurality associated parts graphics, comprising:

means for inputting vehicle-identification data of a damaged vehicle to said processor;

first means, responsive to the vehicle-identification data, for displaying on said display, a list of groups of parts for said damaged vehicle;

second means, responsive to selecting a first group of parts from said list of groups of parts, for displaying, on said display, a parts description from said data base of the first group of parts;

graphics means, responsive to selecting a first part from the parts description, for retrieving from said memory means a parts graphics, stored in digital form and associated with said first part, and loading said parts graphics into a first memory buffer, with said first memory buffer separate from said memory means;

third means, responsive to loading said parts graphics into said first memory buffer, for displaying on said display, said parts graphics;

cost means, responsive to selecting said first part from the parts description, for retrieving from said memory means a first cost for repairing said first part, said cost means, responsive to selecting a second part from the parts description, for retrieving from said memory means a second cost for repairing said second part;

wherein said cost means, responsive to selecting said first part and said second part, retrieves from said memory means a replacement cost for said first group of parts and compares said replacement cost with a first sum of said first cost and said second cost for determining which of said replacement cost and said first sum have a lower cost; and wherein said third means displays on said display said lower cost.

24. The system as set forth in claim 23 wherein said graphics means generates, in digital form, a magnified graphics from said parts graphics and loads said magnified graphics into a second memory buffer, with said second memory buffer separate from said memory means; and further including fourth means responsive to selecting said magnified graphics for swapping said magnified graphics with said parts graphics on said display.

25. The system as set forth in claim 23 further including text means, responsive to selecting said first part from said parts description, for retrieving from said memory means text information, stored in digital form and associated with said first part, said text means loading said text information into a third memory buffer, with said third memory buffer separate from said memory means; and with said third means displaying, on said display, said text information on top of said parts graphics.

26. The system as set forth in claim 25 further including:

fourth means for scrolling a text window over said parts graphics.

27. The system as set forth in claim 23 further comprising:

said processor having a data port;

camera means for taking an electronic photograph in digital form of said damaged vehicle;

interface means for transferring said electronic photograph from said camera means through said data port to said memory means of said processor; and wherein said display displays said electronic photograph on said display with said list of groups of parts for said damaged vehicle.

28. The system as set forth in claim 23 further comprising:

said processor having a data port;

camera means for taking an electronic photograph in digital form of said damaged vehicle;

interface means for transferring said electronic photograph from said camera means through said data port to said memory means of said processor; and wherein said display displays said electronic photograph on said display with said parts description.

29. The system as set forth in claim 23 further comprising:

said processor having a data port;

camera means for taking an electronic photograph in digital form of said damaged vehicle;

interface means for transferring said electronic photograph from said camera means through said data port to said memory means of said processor; and wherein said display displays said electronic photograph on said display with said first part.

30. The system as set forth in claim 23 wherein said cost means responsive to selecting a third part from the parts description retrieves from said memory means a third cost for repairing said third part, said cost means computes a second sum of said first cost, said second cost and said third cost and determines which of said second sum and said replacement cost have a lowest cost; and said third means displays on said display said lowest cost.

31. The system as set forth in claim 23 with said cost means, responsive to selecting a plurality of parts from the parts description, retrieving from said memory means a plurality of costs associated with said plurality of parts for repairing said plurality of parts, and with said cost means, responsive to selecting said first part, said second part, and said plurality of parts, comparing said replacement cost with a third sum of said first cost, said second cost and said plurality of costs for determining which of said replacement cost and said third sum have a lowest cost; and wherein said third means displays on said display said lowest cost.

32. A system including a processor having a display and memory means for storing digital data for a multiplicity of vehicles, said digital data including a data base of a plurality of groups of parts and associated costs for repairing said groups of parts and for replacing said groups of parts, comprising:

means for inputting vehicle-identification data of a damaged vehicle to said processor;

first means responsive to the vehicle-identification data for displaying, on said display, a list of groups of parts for said damaged vehicle;

second means, responsive to selecting a first group of parts from said list of groups of parts, for displaying on said display, a parts description of the first group of parts;

cost means, responsive to selecting a first part from the parts description of the first group of parts, for retrieving from said memory means a first cost for repairing said first part, said cost means, responsive to selecting a second part from the parts description of the first group of parts, for retrieving from said memory means a second cost for repairing said second part;

wherein said cost means, responsive to selecting said first part and said second part, retrieves from said memory means a first replacement cost for said first group of parts and compares, said first replacement cost with a first sum of said first cost and said second cost for determining which of said first replacement cost and said first sum have a first lower cost;

wherein said second means, responsive to selecting a second group of parts from said list of groups of parts, displays on said display, a parts description of the second group of parts;

wherein said cost means, responsive to selecting a third part from the parts description of the second group of parts, retrieves from said memory means a third cost for repairing said third part, and wherein said cost means, responsive to selecting a fourth part from the parts description of the second group of parts, retrieves from said memory means a fourth cost for repairing said fourth part;

wherein said cost means, responsive to selecting said third part and said fourth part, retrieves from said memory means a second replacement cost for said second group of parts and compares said second replacement cost with a second sum of said third cost and said fourth cost for determining which of said second replacement cost and said second sum have a second lower cost;

overlap means, responsive to said first lower cost and said second lower cost, for determining any overlap cost and subtracting from a third sum of said first lower cost and said second lower cost the overlap cost to produce a net cost; and third means for displaying on said display said net cost.

33. The system as set forth in claim 32 wherein said cost means, responsive to selecting a fifth part from the parts description of a third group of parts from said list of groups of parts, retrieves from said memory means a fifth cost for repairing said fifth part, said cost means computes a fourth sum of said first cost, said second cost, said third cost, said fourth cost and said fifth cost, retrieves from said memory means a third replacement cost for said third group of parts and determines which of said fourth sum and said third replacement cost have a lowest cost; and wherein said third means displays on said display said lowest cost.

34. The system as set forth in claim 32 with said cost means, responsive to selecting a plurality of parts from any parts description from said list of groups of parts, for retrieving from said memory means a plurality of costs associated with said plurality of parts for repairing said plurality of parts, said cost means, responsive to selecting said first part, said second part, said third part, said fourth part and said plurality of parts compares a third replacement cost of said first part, said second part said third part, said fourth part and said plurality of darts with a fourth sum of said first cost, said second cost, said third cost, said fourth cost and said plurality of costs, for determining which of said third replacement cost and said fourth sum have a lowest cost; and said third means displays on said display said lowest cost.

35. A system including a processor having a display and memory means for storing digital data for a multiplicity of vehicles, said digital data including a data base of a plurality of groups of parts and a plurality of associated parts graphics, comprising:

means for inputting vehicle-identification data of a damaged vehicle to said processor;

first means, responsive to the vehicle-identification data for displaying on said display a list of groups of parts for said damaged vehicle;

second means, responsive to selecting a first group of parts from said list of groups of parts, for displaying, on said display, a first parts description from said data base of the first group of parts;

graphics means, responsive to selecting a first part from the first parts description, for retrieving from Said memory means a first parts graphics, stored in digital form and associated with said first part, and loading said first parts graphics into a first memory buffer, with said first memory buffer separate from said memory means; and third means, responsive to loading said first parts graphics into said first memory buffer, for displaying, on said display, said first parts graphics;

cost means, responsive to selecting said first part from the first parts description of the first group of parts, for retrieving from said memory means a first cost for repairing said first part, said cost means responsive to selecting a second part from the first parts description of the first group of parts, for retrieving from said memory means a second cost for repairing said second part;

wherein said cost means, responsive to selecting said first part and said second part, retrieves from said memory means a first replacement cost for said first group of parts and compares said first replacement cost with a first sum of said first cost and said second cost for determining which of said first replacement cost and said first sum have a first lower cost;

wherein said second means, responsive to selecting a second group of parts from said list of groups of parts, displays, on said display, a second parts description from said data base of the second group of parts;

wherein said graphics means, responsive to selecting a third part from the second parts description, retrieves from said memory means a second parts graphics, stored in digital form and associated with said third part, and loading said second parts graphics into said first memory buffer;

wherein said third means, responsive to loading said second parts graphics into said first memory buffer, displays, on said display, said second parts graphics;

wherein said cost means, responsive to selecting said third part from the second parts description of the second group of parts, retrieves from said memory means a third cost for repairing said third part, said cost means, responsive to selecting a fourth part from the second parts description of the second group of parts, retrieves from said memory means a fourth cost for repairing said fourth part;

wherein said cost means, responsive to selecting said third part and said fourth part, retrieves from said memory means a second replacement cost for said second group of parts and compares said second replacement cost with a second sum of said third cost and said fourth cost for determining which of said second replacement cost and said second sum have a second lower cost;

overlap means, responsive to said first lower cost and said second lower cost for determining any overlap cost and subtracting from a sum of said first lower cost and said second lower cost the overlap cost to produce a net cost; and said third means for displaying on said display said net cost.

36. The system as set forth in claim 35 wherein said graphics means generates, in digital form, a magnified graphics from at least one of said first parts graphics and said second parts graphics, and loads said magnified graphics into a second memory buffer, with said second memory buffer separate from said memory means; and further including fourth means responsive to selecting said magnified graphics for swapping said magnified graphics with at least one of said first parts graphics and said second parts graphics on said display.

37. The system as set forth in claim 35 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with said list of groups of parts for said damaged vehicle.

38. The system as set forth in claim 35 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with at least one of said first parts description and said second parts description.

39. The system as set forth in claim 35 further comprising:
said processor having a data port;
camera means for taking an electronic photograph in digital form of said damaged vehicle;
interface means for transferring said electronic photograph from said camera means through said data port to said memory means of said processor; and
wherein said display displays said electronic photograph on said display with at least one of said first parts said second part, said third part and said fourth part.

40. A method using a processor having a display and memory means for storing digital data including a parts graphics, comprising the steps, using said processor, of:
inputting vehicle-identification data of a damaged vehicle into said processor;
displaying, on said display, a list of groups of parts for said damaged vehicle;
selecting from said list of groups of parts a first group of parts for display;
displaying, on said display, said first group of parts;
selecting, from said first group of parts, a first part for display;
loading, in response to selecting said first part, said parts graphics into a first memory buffer, with said first memory buffer separate from said memory means;
generating, from said parts graphics, a magnified graphics in digital form;
loading said magnified graphics into a second memory buffer, with said second memory buffer separate from said memory means, said second memory buffer storing said magnified graphics simultaneously as said first memory buffer stores said parts graphics;
displaying, from said first memory buffer onto said display, said parts graphics;
selecting said magnified graphics for display; and
swapping said magnified graphics, from said second memory buffer onto said display, with said parts graphics.

41. The method as set forth in claim 40 further including the steps, using said processor, of:
retrieving, from said memory means, text information, stored in digital form and associated with said first part;
loading said text information into a third memory buffer, with said third memory buffer separate from said memory means; and
displaying, prior to selecting said magnified graphics, onto said display said text information on top of said parts graphics.

42. The method as set forth in claim 41 further comprising the step of:
scrolling a text window over said parts graphics.

43. A method using a processor having a display and memory means for storing digital data including a first parts graphics and a second parts graphics, comprising the steps, using said processor, of:
inputting vehicle-identification data of a damaged vehicle into said processor;
displaying, on said display, a list of groups of parts for said damaged vehicle;
selecting, from said list of groups of parts, a first group of parts for display;
displaying, on said display, said first group of parts;
selecting, from said first group of parts, a first part for display;
retrieving from said memory means, in response to selecting said first part, a first cost for repairing said first part;
loading, in response to selecting said first part, said first parts graphics into a first memory buffer, with said first memory buffer separate from said memory means;
generating from said first parts graphics a first magnified graphics in digital form;
loading said first magnified graphics into a second memory buffer, with said second memory buffer separate from said memory means, said second memory buffer storing said first magnified graphics simultaneously as said first memory buffer stores said first parts graphics;
displaying, from said first memory buffer onto said display, said first parts graphics;
selecting said first magnified graphics for display;
swapping said first magnified graphics, from said second memory buffer onto said display, with said first parts graphics;
selecting, from said first group of parts, a second part for display;
retrieving from said memory means, in response to selecting said second part, a second cost for repairing said second part;
loading, in response to selecting said second part, said second parts graphics into said first memory buffer;
generating, from said second parts graphics, a second magnified graphics in digital form;
loading said second magnified graphics into said second memory buffer;
displaying, from said first memory buffer onto said display, said second parts graphics;
selecting said second magnified graphics for display;
swapping said second magnified graphics, from said second memory buffer onto said display, with said second parts graphics;
computing a sum of said first cost and said second cost;
retrieving from said memory means a replacement cost for said first group of parts;
determining a lower cost of said replacement cost and said sum; and
displaying said lower cost on said display.

44. The method as set forth in claim 43 further including the steps, using said processor, of:
retrieving from said memory means text information, stored in digital form and associated with said first part;
loading said text information into a third memory buffer, with said third memory buffer separate from said memory means; and
displaying onto said display said text information on top of at least one of said first parts graphics and said second parts graphics.

45. The method as set forth in claim 44 further comprising the step of:
scrolling a text window over at least one of said first parts graphics and said second parts graphics.

46. The method as set forth in claim 43 further comprising the steps of:
taking with camera means an electronic photograph in digital form of said damaged vehicle;
transferring said electronic photograph from said camera means to said memory means of said processor; and
displaying said electronic photograph on said display with said list of groups of parts for said damaged vehicle.

47. The method as set forth in claim 43 further comprising the steps of:
taking with camera means an electronic photograph in digital form of said damaged vehicle;
transferring said electronic photograph from said camera means to said memory means of said processor; and
displaying said electronic photograph on said display with a parts description.

48. The method as set forth in claim 43 further comprising the steps of:
taking with camera means an electronic photograph in digital form of said damaged vehicle;
transferring said electronic photograph from said camera means to said memory means of said processor; and
displaying said electronic photograph on said display with said first part.

49. A method using a processor having a display, and memory means for storing digital data including a first parts graphics and a second parts graphics, comprising the steps, using said processor, of:
inputting vehicle-identification data of a damaged vehicle into said processor;
displaying, on said display, a list of groups of parts for said damaged vehicle;
selecting from said list of groups of parts a first group of parts for display;
displaying, on said display, said first group of parts;
selecting from said first group of parts a first part for display;
retrieving from said memory means, in response to selecting said first part, a first cost for repairing said first part;
loading, in response to selecting said first part, said first parts graphics into a first memory buffer, with said first memory buffer separate from said memory means;

displaying, from said first memory buffer onto said display, said first parts graphics;

selecting from said first group of parts a second part for display;

retrieving from said memory means, in response to selecting said second part, a second cost for repairing said second part;

loading, in response to selecting said second part, said second parts graphics into said first memory buffer;

displaying, from said first buffer onto said display, said second parts graphics;

computing a sum of said first cost and said second cost;

retrieving from said memory means a replacement cost for said first group of parts;

determining a lower cost of said replacement cost and said sum; and displaying said lower cost on said display.

50. The method as set forth in claim 49 further comprising the steps of:

taking with camera means an electronic photograph in digital form of said damaged vehicle;

transferring said electronic photograph from said camera means to said memory means; and displaying said electronic photograph on said display with said list of groups of parts for said damaged vehicle.

51. The method as set forth in claim 49 further comprising the steps of:

taking with camera means an electronic photograph in digital form of said damaged vehicle;

transferring said electronic photograph from said camera means to said memory means and displaying said electronic photograph on said display with a parts description 52. The method as set forth in claim 49 further comprising the steps of:

taking with camera means an electronic photograph in digital form of said damaged vehicle;

transferring said electronic photograph from said camera means to said memory means; and displaying said electronic photograph on said display with at least one of said first parts graphics and said second parts graphics.

53. The method as set forth in claim 49 including the steps, using said processor, of:

retrieving from said memory means text information, stored in digital form and associated with said first part;

loading said text information into a second memory buffer, with said second memory buffer separate from said memory means; and displaying onto said display said text information on top of at least one of said first parts graphics and said second parts graphics.

54. The method as set forth in claim 49 further comprising the step of:

scrolling a text window over at least one of said first parts graphics and said second parts graphics.

55. A system including a processor having a data port, a display, and memory means for snoring digital data for a multiplicity of vehicles, said digital data including a data base of a plurality of groups of parts and a plurality of associated parts graphics, comprising:

camera means for taking an electronic photograph in digital form of a damaged vehicle;

interface means for transferring said electronic photograph from said camera means through said data port to said memory means of said processor;

said processor further comprising, means for inputting vehicle-identification data of said damaged vehicle to said processor;

first means, responsive to the vehicle-identification data, for displaying on said display said electronic photograph and a list of groups of parts for said damaged vehicle;

second means, responsive to selecting a first group of parts from said list of groups of parts, for displaying on said display said electronic photograph and a parts description from said data base of the first group of parts;

graphics means, responsive to selecting a first part from the parts description, for retrieving from said memory means a first parts graphics, stored in digital form and associated with the first part, said graphics means loading said first parts graphics into a first memory buffer, said graphics means generating, in digital form, a first magnified graphics of said first parts graphics and said graphics means loading said first magnified graphics into a second memory buffer;

third means, responsive to loading said first parts graphics into said first memory buffer, for displaying on said display said electronic photograph and said first parts graphics;

fourth means, responsive to selecting said first magnified graphics, for swapping said first magnified graphics from said second memory buffer with said first parts graphics on said display, and displaying said electronic photograph with said first magnified graphics;

cost means, responsive to selecting the first part from the parts description of the first group of parts, for retrieving from said memory means a first cost for repairing the first part, said cost means responsive to selecting a second part from the parts description of the first group of parts for retrieving from said memory means a second cost for repairing the second part;

wherein said cost means, responsive to selecting the first part and the second part, retrieves from said memory means a replacement cost for said first group of parts and compares said replacement cost with a first sum of the first cost and the second cost for determining which of said replacement cost and said first sum have a lower cost; and wherein said third means displays on said display said lower cost.

56. The system as set forth in claim 55, wherein:

said cost means, responsive to selecting a plurality of parts from the parts description of the first group of parts, retrieves from said memory means a third cost for repairing said plurality of parts, said cost means computes a second sum of the first cost, the second cost, and said third cost, retrieves from said memory means said replacement cost for said first group of parts and determines which of said second sum and said replacement cost have a lower cost; and said third means displays on said display said lower cost.

57. A system including a processor having a data port, a display, and memory means for storing digital data for a multiplicity of vehicles, said digital data including a data base of a plurality of groups of parts and a plurality of associated parts graphics, comprising:

camera means for caking an electronic photograph in digital form of a damaged vehicle;

interface means for transferring said electronic photograph from said camera means through said data port to said memory means of said processor;

said processor further comprising, means for inputting vehicle-identification data first means, responsive to the vehicle-identification data, for displaying on said display said electronic photograph and a list of groups of parts for said damaged vehicle;

second means, responsive to selecting a first group of parts from said list of groups of parts, for displaying on said display said electronic photograph and a parks description from said data base of the first group of parts;

graphics means, responsive to selecting a first pare from the parts description, for retrieving from said memory means a first parts graphics, stored in digital form and associated with the first part, said graphics means loading said first parts graphics into a first memory buffer, said graphics means generating, in digital form, a first magnified graphics of said first parts graphics and said graphics means loading said first magnified graphics into a second memory buffer;

third means, responsive to loading said first parts graphics into said first memory buffer, for displaying on said display said electronic photograph and said first parts graphics;

fourth means, responsive to selecting said first magnified graphics, for swapping said first magnified graphics from said second memory buffer with said first parts graphics on said display, and displaying said electronic photograph with said first magnified graphics;

cost means, responsive to selecting the first part from the parts description of the first group of parts, for retrieving from said memory means a first cost for repairing the first part, said cost means responsive to selecting a plurality of parts from the parts description of the first group of parts for retrieving from said memory means a second cost for repairing said plurality of parts;

wherein said cost means, responsive to selecting the first part and said plurality of parts, retrieves from said memory means a replacement cost for said first group of parts and compares said replacement cost with a sum of the first cost and the second cost for determining which of said replacement cost and said sum have a lower cost; and wherein said third means displays on said display said lower cost.

58. A system including a processor having a display and memory means for storing digital data for a multiplicity of vehicles, said digital data including a data base of a plurality of groups of parts consisting of groups of parts and a plurality of associated parts graphics, comprising:

means for inputting vehicle-identification data of a damaged vehicle to said processor;

first means, responsive to the vehicle-identification data, for displaying on said display a list of groups of parts for said damaged vehicle;

second means, responsive to selecting a first group of parts from said list of groups of parts, for displaying on said display a pares description from said data base of the first group of parts;

graphics means, responsive no selecting a first part from the parts description, for retrieving from said memory means a parts graphics, stored in digital form and associated with said first part, and loading said parts graphics into a first memory buffer, with said first memory buffer separate from said memory means;

third means, responsive to loading said parts graphics into said first memory buffer, for displaying on said display said parts graphics;

cost means, responsive to selecting said first part from the parts description, for retrieving from said memory means a first cost for repairing said first part, said cost means, responsive to selecting a second part from the parts description, for retrieving from said memory means a second cost for repairing said second part;

wherein said cost means, responsive no selecting said first part and said second part, retrieves from said memory means a replacement cost for said first group of parts and compares said replacement cost with a first sum of said first cost and said second cost for determining a lower cost of said replacement cost add said first sum; and wherein said third means displays on said display said lower cost.

59. The system as sen forth in claim 58, wherein:

said cost means, responsive to selecting a plurality of parts from the parts description of the first group of parts, retrieves from said memory means a plurality of costs for repairing said plurality of parts, said cost means computes a third sum of said first cost, said second cost, and said plurality of costs, retrieves from said memory means the first replacement cost for said first group of parts and determines the lower cost of said third sum and said first replacement cost; and said third means displays on said display said lower cost.

60. A system including a processor having a display and memory means for snoring digital data for a multiplicity of vehicles, said digital data including a data base of a plurality of groups of parts consisting of a plurality of parts and a plurality of associated parts graphics, comprising:

means for inputting vehicle-identification data of a damaged vehicle to said processor;

first means responsive to the vehicle-identification data, for displaying on said display a list of groups of parts for said damaged vehicle;

second means, responsive to selecting a first group of parts from said list of groups of parts, for displaying on said display a parts description from said data base of the first group of parts;

graphics means, responsive to selecting a first part from the parts description, for retrieving from said memory means a parts graphics, stored in digital form and associated with said first part, and loading said parts graphics into a first memory buffer, with said first memory buffer separate from said memory means;

third means, responsive to loading said parts graphics into said first memory buffer, for displaying on said display said parts graphics;

cost means, responsive to selecting said first part from the parts description, for retrieving from said memory means a first cost for repairing said first part, said cost means, responsive to selecting a plurality of parts from the parts description, for retrieving from said memory means a second cost for repairing said plurality of parts;

wherein said cost means, responsive to selecting said first part and said plurality of parts, retrieves from said memory means a replacement cost for said first group of parts and compares said replacement cost with a sum of said first cost and said second cost for determining a lower cost of said replacement cost and said sum; and wherein said third means displays on said display said lower cost.

61. A system including a processor having a display and memory means for storing digital data for a multiplicity of vehicles, said digital data including a data base of a plurality of groups of parts consisting of a plurality of parts and associated costs for replacing said plurality of groups of parts and for repairing said plurality of parts, comprising:

means for inputting vehicle-identification data of a damaged vehicle to said processor;

first means, responsive to the vehicle-identification data, for displaying on said display a list of groups of parts for said damaged vehicle;

second means, responsive to selecting a first group of parts from said list of groups of parts, for displaying on said display a parts description of the first group of parts;

cost means, responsive to selecting a first part from the parts description of the first group of parts for retrieving from said memory means a first cost for repairing said first part, said cost means, responsive to selecting a second part from the parts description of the first group of parts, for retrieving from said memory means a second cost for repairing said second part;

wherein said cost means, responsive to selecting said first part and said second part, retrieves from said memory means a first replacement cost for said first group of parts and compares said first replacement cost with a first sum of said first cost and said second cost for determining a first lower cost of said first replacement cost and said first sum;

wherein said second means, responsive to selecting a second group of parts from said list of groups of parts, displays on said display, a parts description of the second group of parts;

wherein said cost means, responsive to selecting a third part from the parts description of the second group of parts, retrieves from said memory means a third cost for repairing said third part, and wherein said cost means, responsive to selecting a fourth part from the parts description of the second group of parts, retrieves from said memory means a fourth cost for repairing said fourth part;

wherein said cost means, responsive to selecting said third part and said fourth part, retrieves from said memory means a second replacement cost for said second group of parts and compares said second replacement cost with a second sum of said third cost and said fourth cost for determining a second lower cost of said Second replacement cost and said second sum; overlap means, responsive to said first lower cost and said second lower cost, for determining any overlap cost and subtracting from a third sum of said first lower cost and said second lower cost the overlap cost to produce a first net cost; and third means for displaying on said display said first net cost.

62. The system as set forth in claim 61, wherein said cost means, responsive to selecting a fifth part from the parts description of the first group of parts, retrieves from said memory means a fifth cost for repairing said fifth part, said cost means computes a fourth sum of said first cost, said second cost, and said fifth cost, retrieves from said memory means the first replacement cost for said first group of parts and determines the first lower cost of said fourth sum and said first replacement cost.

63. The system as set forth in claim 61, wherein said cost means, responsive to selecting a plurality of parts from the parts description of the first group of parts, retrieves from said memory means a plurality of costs for repairing said plurality of parts, said cost means computes a fourth sum of said first cost, said second cost, and said plurality of costs, retrieves from said memory means the first replacement cost for said first group of parts and determines the first lower cost of said fourth sum and said first replacement cost.

64. The system as set forth in claim 61, wherein said cost means, responsive to selecting a fifth part from the parts description of the second group of parts, retrieves from said memory means a fifth cost for repairing said fifth part, said cost means computes a fourth sum of said third cost, said fourth cost, and said fifth cost, retrieves from said memory means the second replacement cost for said second group of parts and determines the second lower cost of said fourth sum and said second replacement cost.

65. The system as set forth in claim 61, wherein said cost means, responsive to selecting a plurality of parts from the parts description of the second group of parts, retrieves from said memory means a plurality of costs for repairing said plurality of parts, said cost means computes a fourth sum of said third cost, said fourth cost, and said plurality of costs, retrieves from said memory means the second replacement cost for Said second group of parts and determines the second lower cost of said fourth sum and said second replacement cost.

66. The system as set forth in claim 61, wherein:

said cost means, responsive to selecting a plurality of parts from the parts description of a plurality of groups of parts, retrieves from said memory means a plurality of costs for repairing said plurality of parts;

said cost means retrieves from said memory means a plurality of replacement costs for said plurality of groups of parts and compares said plurality of replacement costs with a fourth sum of the plurality of costs for determining a third lower cost of said plurality of replacement costs and said fourth sum; and overlap means, responsive to said first lower cost and said third lower cost, for determining any overlap cost and subtracting from a fifth sum of said first lower cost and said third lower cost the overlap cost to produce a second net cost.

67. A system including a processor having a display and memory means for storing digital data for a multiplicity of vehicles, said digital data including a data base of a plurality of groups of parts consisting of a plurality of parts and associated costs for replacing said plurality of groups of parts and for repairing said plurality of parts, comprising:

means for inputting vehicle-identification data of a damaged vehicle to said processor;

first means, responsive to the vehicle-identification data, for displaying on said display a list of groups of parts for said damaged vehicle;

second means, responsive to selecting a first group parts from said list of groups of parts, for displaying on said display a parts description of the first group of parts;

cost means, responsive to selecting a first part from the parts description of the first group of parts, for retrieving from said memory means a first cost for repairing said first part, said cost means, responsive to selecting a first plurality of parts from the parts description of the first group of parts, for retrieving from said memory means a second cost for repairing said first plurality of parts;

wherein said cost means, responsive to selecting said first part and said first plurality of parts, retrieves said memory means a first replacement cost for said first group of parts and compares said first replacement cost with a first sum of said first cost and said second cost for determining a first lower cost of said first replacement cost and said first sum;

wherein said second means, responsive to selecting a second group of parts from said list of groups of parts, displays on said display a parts description of the second group of parts;

wherein said cost means, responsive to selecting a second part from the parts description of the second group of parts, retrieves from said memory means a third cost for repairing said second part, and wherein said cost means, responsive to selecting a second plurality of parts from the parts description of the second group of parts, retrieves from said memory means a fourth cost for repairing said second plurality of parts;

wherein said cost means, responsive to selecting said second part and said second plurality of parts, retrieves from said memory means a second replacement cost for said second group of parts and compares said second replacement cost with a second sum of said third cost and said fourth cost for determining a second lower cost of said second replacement cost and said second sum;

overlap means, responsive to said first lower cost and said second lower cost, for determining any overlap cost and subtracting from a third sum of said first lower cost and said second lower cost the overlap cost to produce a net cost; and third means for displaying on said display said net cost.

68. A system including a processor having a display and memory means for storing digital data for a multiplicity of vehicles, said digital data including a data base of a plurality of groups of parts consisting of a plurality of parts and associated costs for replacing said plurality of groups of parts and for repairing said plurality of parts, comprising:

means for inputting vehicle-identification data of a damaged vehicle to said processor;

first means, responsive to the vehicle-identification data, for displaying on said display a list of groups of parts for said damaged vehicle;

second means, responsive to selecting a first group of parts from said list of groups of parts, for displaying on said display a parts description of the first group of parts;

cost means, responsive to selecting a first part from the parts description of the first group of parts, for retrieving from said memory means a first cost for repairing said first part, said cost means, responsive to selecting a second part from the parts description of the first group of parts, for retrieving from said memory means a second cost for repairing said second part, and said cost means, responsive to selecting a first plurality of parts from the parts description of the first group of parts, for retrieving from said memory means a third cost for repairing said first plurality of parts;

wherein said cost means, responsive to selecting said first part and said second part and said first plurality of parts, retrieves from said memory means a first replacement cost for said first group of parts and compares said first replacement cost with a first sum of said first cost and said second cost and said third coot for determining a first lower cost of said first replacement cost and said first sum;

wherein said second means, responsive to selecting a second group of parts from said list of groups of parts, displays on said display, a parts description of the second group of parts;

wherein said cost means, responsive to selecting a third part from the parts description of the second group of parts, retrieves from said memory means a fourth cost for repairing said third part, and wherein said cost means, responsive to selecting a fourth part from the parts description of the second group of parts, retrieves from said memory means a fifth cost for repairing said fourth part, and wherein said cost means, responsive to selecting a second plurality of parts from the parts description of the second group of parts, retrieves from said memory means a sixth cost for repairing said second plurality of parts;

wherein said cost means, responsive to selecting said third part and said fourth part and said second plurality of parts, retrieves from said memory means a second replacement cost for said second group of parts and compares said second replacement cost with a second sum of said fourth cost and said fifth cost and said sixth cost for determining a second lower cost of said second replacement cost and said second sum;

overlap means, responsive to said first lower cost and said second lower cost, for determining any overlap cost and subtracting from a third sum of said first lower cost and said second lower cost the overlap Cost to produce a net cost; and third means for displaying on said display said net cost.

69. A method using a processor having a display and memory means for storing digital data including a parts graphics comprising the steps, using said processor, of:

inputting vehicle-identification data of a damaged vehicle into said processor;

displaying, on said display, a list of groups of parts for said damaged vehicle;

selecting from said list of groups of parts a first group of parts for display;

displaying, on said display, said first group of parts;

selecting from said first group of parts a first part for display;

retrieving from said memory means, in response selecting said first part, a first cost for repairing said first part;

selecting from said first group of parts a second part for display;

retrieving from said memory means, in response to selecting said second part, a second cost for repairing said second part;

computing a first sum of said first cost and said second cost;

retrieving from said memory means a first replacement cost for said first group of parts;

determining a first lower cost of said first replacement cost and said first sum; and displaying said first lower cost on said display.

70. The method as set forth in claim 69 further comprising the steps selecting from said list of groups of parts a second group of parts for display;

displaying, on said display, said second group of parts;

selecting from said second group of parts a third part for display;

retrieving from said memory means, in response selecting said third part, a third cost for repairing said third part;

selecting from said second group of parts a fourth part for display;

retrieving from said memory means, in response to selecting said fourth part, a fourth cost for repairing said fourth part;

computing a second sum of said third cost and said fourth cost;

retrieving from said memory means a second replacement cost for said second group of parts;

determining a second lower cost of said second replacement cost and said second sum;

comparing said first lower cost and said second lower cost for determining any overlap cost;

subtracting from a third sum of said first lower cost and said second lower cost the overlap cost to produce a net cost; and displaying said net cost on said display.

71. The method as set forth in claim 69 further comprising the steps of:

selecting from said list of groups of parts a plurality of groups of parts for display;

displaying, on said display, said plurality of groups of parts;

selecting from said plurality of groups of parts a plurality of parts for display;

retrieving from said memory means, in response to selecting said plurality of parts, a plurality of costs for repairing said plurality of parts;

computing a second sum of said plurality of costs;

retrieving from said memory means a second replacement cost for said second group of parts;

determining a second lower cost of said second replacement cost and said second sum;

comparing said first lower cost and said second lower cost for determining any overlap cost;

subtracting from a third sum of said first lower cost and said second lower cost the overlap cost to produce a net cost; and displaying said net cost on said display.

72. A method using a processor having a display and memory means for storing digital data including a parts graphics comprising the steps, using said processor, of:

inputting vehicle-identification data of a damaged vehicle into said processor;

displaying, on said display, a lien of groups of parts for said damaged vehicle;

selecting from said list of groups of parts a first group of parts for display;

displaying, on said display, said first group of parts;

selecting from said first group of parts a first part for display;

retrieving from said memory means, in response to selecting said first part, a first cost for repairing said first part;

selecting from said first group of parts a first plurality of parts for display;

retrieving from said memory means, in response to selecting said first plurality of parts, a second cost for repairing said first plurality of parts;

computing a first sum of said first cost and said second cost;

retrieving from said memory means a first replacement cost for said first group of parts;

determining a first lower cost of said first replacement cost and said first sum; and displaying said first lower cost on said display.

73. The method as set forth in claim 72 further comprising the steps of:

selecting from said list of groups of parts a second group of parts for display;

displaying, on said display, said second group of parts;

selecting from said second group of parts a second part for display;

retrieving from said memory means, in response to selecting said second part, a third cost for repairing said second part;

selecting from said second group of parts a second plurality of parts for display;

retrieving from said memory means, in response to selecting said second plurality of parts, a fourth cost for repairing said second plurality of parts;

computing a second sum of said third cost and said fourth cost;

retrieving from said memory means a second replacement cost for said second group of parts;

determining a second lower cost of said second replacement cost and said second sum;

comparing said first lower cost and said second lower cost for determining any overlap cost;

subtracting from a third sum of said first lower cost and said second lower cost the overlap cost to produce a net cost; and displaying said net cost on said display.

74. A method using a processor having a display and memory means for storing digital data including a parts graphics comprising the steps, using said processor, of:

inputting vehicle-identification data of a damaged vehicle into said processor;

displaying, on said display, a list of groups of parts for said damaged vehicle;

selecting from said list of groups of parts a first group of parts for display;

displaying, on said display, said first group of parts;

selecting from said first group of parts a first part for display;

retrieving from said memory means, in response to selecting said first part, a first cost for repairing said first part;

selecting from said first group of parts a first plurality of pares for display;

retrieving from said memory means, in response to selecting said first plurality of parts, a second cost for repairing said first plurality of parts;

computing a first sum of said first cost and said second cost;

retrieving from said memory means a first replacement cost for said first group of parts;

determining a first lower cost of said first replacement cost and said first sum;

selecting from said list of groups of parts a second group of parts for display;

displaying, on said display, said second group of parts;

selecting from said second group of parts a second part for display;

retrieving from said memory means, in response to selecting said second part, a third cost for repairing said second part;

selecting from said second group of parts a second plurality of parts for display;

retrieving from said memory means, in response to selecting said second plurality of parts, a fourth cost for repairing said second plurality of parts;

computing a second sum of said third cost and said fourth cost;

retrieving from said memory means a second replacement cost for said second group of parts;

determining a second lower cost of said second replacement cost and said second sum;

comparing said first lower cost and said second lower cost for determining any overlap cost;

subtracting from a third sum of said first lower cost and said second lower cost the overlap cost to produce a net cost; and displaying said net cost on said display.

* * * * *

UNITED STATES PATENT AND TRADEMARK OFFICE
CERTIFICATE OF CORRECTION

PATENT NO. : 5,432,904
DATED : July 11, 1995
INVENTOR(S) : David C. Wong

It is certified that error appears in the above-indentified patent and that said Letters Patent is hereby corrected as shown below:

In the Claims
Col. 12,
In claim 3, line 6, after "buffer" insert --,--.
Col. 16,
In claim 23, line 4, delete "of-groups" and substitute --of groups--.

In claim 23, line 4, after the second occurrence of "plurality" insert --of--.
Col. 18,
In claim 34, line 9, after the second occurrence of "part" insert --,--.

In claim 34, line 11, delete "darts" and substitute --parts--.

In claim 35, line 17 (column 19, line 1), delete "Said" and substitute --said--.
Col. 23,
In claim 51, line 6, after the second occurrence of "means" insert --;--.

In claim 51, line 8, after "description" insert --.--.
Column 23,
In claim 55, line 2, delete "snoring" and substitute --storing--.

In claim 57, line 6 (column 25, line 3), delete "caking" and substitute --taking--.

UNITED STATES PATENT AND TRADEMARK OFFICE
CERTIFICATE OF CORRECTION

PATENT NO. : 5,432,904
DATED : July 11, 1995
INVENTOR(S) : David C. Wong

It is certified that error appears in the above-indentified patent and that said Letters Patent is hereby corrected as shown below:

<u>In the Claims</u>

In claim 57, line 12 (column 25, line 9), after "data" insert --of said damaged vehicle to said processor;--.

In claim 57, line 20 (column 25, line 17), delete "parks" and substitute --parts--.

In claim 57, line 22 (column 25, line 19), delete "pare" and substitute --part--.

In claim 58, line 14 (column 26, line 1), delete "pares" and substitute --parts--.

In claim 58, line 16 (column 26, line 3), delete "no" and substitute --to--.

In claim 58, line 33 (column 26, line 20), delete "no" and substitute --to--.

In claim 58, line 39 (column 26, line 26), delete "add" and substitute --and--.

Column 26,
In claim 60, line 2, delete "snoring" and substitute --storing--.

In claim 60, line 9, after "means" insert --,--.

In claim 61, line 18, after the second occurrence of "parts" insert --,--.

UNITED STATES PATENT AND TRADEMARK OFFICE
CERTIFICATE OF CORRECTION

PATENT NO. : 5,432,904  
DATED : July 11, 1995  
INVENTOR(S) : David C. Wong

Page 3 of 4

It is certified that error appears in the above-indentified patent and that said Letters Patent is hereby corrected as shown below:

In the Claims

Column 27,

In claim 61, line 50, delete "Second" and substitute --second--.

Column 28,

In claim 65, line 8, delete "Said" and substitute --said--.

Column 28,

In claim 66, line 3, delete "description" and substitute --descriptions--.

In claim 67, line 13 (column 29, line 8), after "group" insert --of--.

In claim 67, line 26 (column 29, line 21), after "retrieves" insert --from--.

In claim 68, line 35 (column 30, line 21), delete "coot" and substitute --cost--.

In claim 68, line 67 (column 30, line 53), delete "Cost" and substitute --cost--.

In claim 69, line 13 (column 31, line 1), after "response" insert --to--.

Column 31,

In claim 70, line 2, after "steps" insert --of:--.

In claim 70, line 9, after "response" insert --to--.

UNITED STATES PATENT AND TRADEMARK OFFICE
CERTIFICATE OF CORRECTION

PATENT NO. : 5,432,904
DATED : July 11, 1995
INVENTOR(S) : David C. Wong

It is certified that error appears in the above-indentified patent and that said Letters Patent is hereby corrected as shown below:

<u>In the Claims</u>

In claim 72, line 6 (column 32, line 3), delete "lien" and substitute --list--.

In claim 74, line 17 (column 33, line 2), delete "pares" and substitute --parts--.

Signed and Sealed this

Tenth Day of September, 1996

Attest:

BRUCE LEHMAN

*Attesting Officer*   *Commissioner of Patents and Trademarks*